US012279183B2

(12) United States Patent
Selvanesan et al.

(10) Patent No.: US 12,279,183 B2
(45) Date of Patent: Apr. 15, 2025

(54) GROUPCAST PROCEDURES FOR V2X

(71) Applicant: Fraunhofer-Gesellschaft zur Förderung der angewandten Forschung e.V., Munich (DE)

(72) Inventors: Sarun Selvanesan, Berlin (DE); Thomas Fehrenbach, Berlin (DE); Roya Ebrahim Rezagah, Berlin (DE); Cornelius Hellge, Berlin (DE); Thomas Wirth, Berlin (DE); Thomas Schierl, Berlin (DE); Robin Thomas, Berlin (DE); Baris Göktepe, Berlin (DE); Eiko Seidel, Sauerlach (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 18/731,325

(22) Filed: Jun. 2, 2024

(65) Prior Publication Data
US 2024/0323654 A1 Sep. 26, 2024

Related U.S. Application Data

(63) Continuation of application No. 17/377,642, filed on Jul. 16, 2021, now Pat. No. 12,028,781, which is a
(Continued)

(30) Foreign Application Priority Data

Jan. 18, 2019 (EP) .................................. 19152660

(51) Int. Cl.
*H04W 8/00* (2009.01)
*H04W 4/08* (2009.01)
(Continued)

(52) U.S. Cl.
CPC ............... *H04W 4/08* (2013.01); *H04W 4/40* (2018.02); *H04W 92/18* (2013.01)

(58) Field of Classification Search
None
See application file for complete search history.

(56) References Cited

U.S. PATENT DOCUMENTS 10,182,335 B2    1/2019  Kim et al.
12,028,781 B2 *  7/2024  Selvanesan ........... H04W 4/029
(Continued)

FOREIGN PATENT DOCUMENTS

CN       105745852 A    7/2016
CN       107079530 A    8/2017
(Continued)

OTHER PUBLICATIONS

Baosen Xue, "Office Action for CN Application No. 202080022439.8", Mar. 30, 2022, CNIPA, China.
(Continued)

*Primary Examiner* — Gary Lafontant
(74) *Attorney, Agent, or Firm* — NKL LAW; Jae Youn Kim

(57) ABSTRACT

A wireless communication system includes a plurality of user devices, UEs, and at least one logical group defined in accordance with one or more logical group criteria. The logical group includes a plurality of member UEs to be connected via sidelink for sidelink communication with each other, and all member UEs of the logical group have assigned the same destination identification, ID, the destination ID being unique for the logical group.

15 Claims, 12 Drawing Sheets

Related U.S. Application Data continuation of application No. PCT/EP2020/050830, filed on Jan. 14, 2020.

(51) Int. Cl.
*H04W 4/40* (2018.01)
*H04W 72/04* (2023.01)
*H04W 92/18* (2009.01)

(56) References Cited

U.S. PATENT DOCUMENTS

| | | |
|---|---|---|
| 2017/0257876 A1 | 9/2017 | Loehr et al. |
| 2018/0035276 A1* | 2/2018 | Kang ............... H04W 72/02 |
| 2018/0249524 A1 | 8/2018 | Yi et al. |
| 2020/0288344 A1 | 9/2020 | Zhang et al. |
| 2022/0078818 A1 | 3/2022 | Sun et al. |

FOREIGN PATENT DOCUMENTS

| | | |
|---|---|---|
| CN | 108028863 A | 5/2018 |
| JP | 2018536347 A | 12/2018 |
| KR | 101790194 B1 | 10/2017 |
| WO | 2009018835 A1 | 2/2009 |
| WO | 2015077619 A2 | 5/2015 |
| WO | 2016/148544 A1 | 9/2016 |
| WO | 2017073944 A1 | 5/2017 |
| WO | 2017/176099 A1 | 10/2017 |

OTHER PUBLICATIONS

Qualcomm Incorporated, "Discussion on Groupcast for NR V2X", 3GPP Draft, R2-1817780, Qualcomm, Spokane, USA, Nov. 2018.
3GPP TR 23.786, "Study on architecture enhancements for EPS and 5G System to support advanced V2X services (Release 16)", V0.10.0, 3GPP, Dec. 2018.
3GPP TS 23.303, "Proximity-based services (ProSe); Stage 2 (Release 15)", V15.1.0, 3GPP, Jun. 2010.
J. Schilienz et al., "Device-to-Device Communication in LTE", Rohde-Schwarz Whitepaper, Sep. 2015.
3GPP TS 23.286 version 16.4.0 Release 16 TR 23.795, Study on application layer support for V2X services, Oct. 2020.
Chih-Che Lin et al., "On the Performance of Vehicular Group Communications in IEEE 1609/802.11(p) Networks", Vehicular Technology Conference (VTC Fall), 2011 IEEE, IEEE, (Sep. 5, 2011), doi: 10.1109/VETECF.2011.6092892, ISBN 978-1-4244-8328-0, pp. 1-5, XP032029376 [A] 1-8,26,28-30,34,35,37,38,40-43 * Section III * * figure 1 * DOI: http://dx.doi.org/10.1109/VETECF.2011.6092892.
Vikash Kumar, "Office Action for IN Application No. 202137032224", Apr. 1, 2022, Intellectual Property India, India.
Huawei, Hisilicon, "Solution to dynamic group management", 3GPP TSG SA WG6 #022 S6-180312, 3GPP, Feb. 26, 2018.
Ericsson, Interdigital, "V2X authorisation and provisioning", 3GPP TSG CT WG1#100 C1-164751, 3GPP, Oct. 24, 2016.
Huawei, Hisilicon, "Overview of sidelink unicast, groupcast and broadcast support for NR V2X", 3GPP TSG RAN WG1 #94 R1-1808091, 3GPP, Aug. 10, 2018.
NEC, "Resource allocation mechanism for NR V2X", 3GPP TSG RAN WG1 adhoc_NR_AH_1901 R1-1900671, 3GPP, Jan. 11, 2019.
Ericsson, "Solution for KI#3: QoS Support for eV2X over Uu interface", 3GPP TSG SA WG2 #128 S2-186409, 3GPP, Jun. 26, 2018.
Huawei, Hisilicon, "Sidelink CSI", 3GPP TSG RAN WG1 #95 R1-1813553, 3GPP, Nov. 3, 2018.
China Mobile, "Adding new requirements of Platoon", 3GPP TSG SA WG1 #78 S1-172298, 3GPP, May 16, 2017.
Huawei, Hisilicon, "Evaluation and enhancement of NR Uu for advanced V2X use cases", 3GPP TSG RAN WG1 #94 R1-1808102, 3GPP, Aug. 10, 2018.
QUALCOMM Incorporated, "Solution for V2X Communications over PC5-high level function and protocol stacks", 3GPP TSG-SA WG2#116 S2-163519, 3GPP, Jul. 5, 2016.
Fraunhofer HHI, Fraunhofer IIS, "Designs for NR V2X Mode 2 Resource Allocation", 3GPP TSG RAN WG1 #95 R1-1812399, 3GPP, Nov. 2, 2018.
Samsung, Samsung, Pseudo-CR on V2X group communication, 3GPP TSG SA WG6#024 S6-180815, 3GPP, May 14, 2018 (year/month/day) (publication showing well-known technology) (Newly added publication).

* cited by examiner

```
-- ASN1START
SidelinkUEInformation-v1430-IEs ::= SEQUENCE {
    v2x-CommRXInterestedFreqList-r14    SL-V2X-CommFreqList-r14
OPTIONAL,
    p2x-CommTxType-r14                  ENUMERATED {true}
OPTIONAL,
    v2x-CommTxResourceReq-r14           SL-V2X-CommTxFreqList-r14   OPTIONAL,
    nonCriticalExtension                SidelinkUEInformation-v1530-IEs
OPTIONAL
}

SidelinkUEInformation-v1530-IEs ::= SEQUENCE {
    reliabilityInfoListSL-r15           SL-ReliabilityList-r15      OPTIONAL,
    nonCriticalExtension                SEQUENCE {}                 OPTIONAL
}

SL-CommTxResourceReq-r12 ::=    SEQUENCE {
carrierFreq-r12                 ARFCN-ValueEUTRA-r9         OPTIONAL,
destinationInfoList-r12         SL-DestinationInfoList-r12
v2x-platoon                     SL-V2X-Platoon
}

SL-DiscTxResourceReqPerFreqList-r13 ::=SEQUENCE (SIZE (1..maxFreq)) OF SL-
DiscTxResourceReq-r13

SL-DestinationInfoList-r12 ::= SEQUENCE (SIZE (1..maxSL-Dest-r12)) OF SL-
DestinationIdentity-r12

SL-DestinationIdentity-r12 ::= BIT STRING (SIZE (24))

SL-V2X-Platoon-r ::= SEQUENCE {
V2X-Platoon             ENUMERATED {true}
Platoon-Identity        BIT STRING (SIZE (3))}
```

Fig. 15

GROUPCAST PROCEDURES FOR V2X

CROSS-REFERENCES TO RELATED APPLICATIONS

This application is a continuation of copending U.S. patent application Ser. No. 17/377,642, filed Jul. 16, 2021, which in turn is a continuation of copending International Application No. PCT/EP2020/050830, filed Jan. 14, 2020, which is incorporated herein by reference in its entirety, and additionally claims priority from European Application No. EP 19 152 660.7, filed Jan. 18, 2019, which is incorporated herein by reference in its entirety.

The present application relates to the field of wireless communication systems or networks, more specifically to approaches for a wireless communication among user devices of a wireless communication system using a sidelink communication, like a V2X communication. Embodiments concern improvements in the communication over the sidelink with or within a group of user devices.

BACKGROUND OF THE INVENTION

FIGS. 1(a)-(b) are schematic representations of an example of a terrestrial wireless network 100 including, as is shown in FIG. 1(a), a core network 102 and one or more radio access networks $RAN_1$, $RAN_2$, .... $RAN_N$. FIG. 1(b) is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the $RAN_n$ may include more or less such cells, and $RAN_n$ may also include only one base station. FIG. 1(b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1(b) by the arrows pointing to "core". The core network 102 may be connected to one or more external networks. Further, some or all of the respective base station $gNB_1$ to $gNB_5$ may connected, e.g. via the S1 or X2 interface or the XN interface in NR, with each other via respective backhaul links $1161$ to $1165$, which are schematically represented in FIG. 1(b) by the arrows pointing to "gNBs".

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and a system information block (SIB), the physical downlink, uplink and sidelink control channels (PDCCH, PUCCH, PSSCH) carrying for example the downlink control information (DCI), the uplink control information (UCI) and the sidelink control information (SCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

The wireless network or communication system depicted in FIGS. 1(a)-(b) may by a heterogeneous network having distinct overlaid networks, e.g., a network of macro cells with each macro cell including a macro base station, like base station $gNB_1$ to $gNB_5$, and a network of small cell base stations (not shown in FIGS. 1(a)-(b)), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIGS. 1(a)-(b), for example in accordance with the LTE-Advanced Pro standard or the 5G or NR, new radio, standard.

In mobile communication networks, for example in a network like that described above with reference to FIG. 1(a)-(b), like an LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above-mentioned devices. Such devices may also communicate directly with each other (D2D communication) using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIGS. 1(a)-(b). This is referred to as an "in-coverage" scenario. Another scenario is referred to as an "out-of-coverage" scenario. It is noted that "out-of-coverage" does not mean that the two UEs are not within one of the cells depicted in FIGS. 1(a)-(b), rather, it means that these UEs

- may not be connected to a base station, for example, they are not in an RRC connected state, so that the UEs do not receive from the base station any sidelink resource allocation configuration or assistance, and/or
- may be connected to the base station, but, for one or more reasons, the base station may not provide sidelink resource allocation configuration or assistance for the UEs, and/or
- may be connected to the base station that may not support NR V2X services, e.g. GSM, UMTS, LTE base stations.

When considering two UEs directly communicating with each other over the sidelink, e.g. using the PC5 interface, one of the UEs may also be connected with a BS, and may relay information from the BS to the other UE via the sidelink interface. The relaying may be performed in the same frequency band (in-band-relay) or another frequency band (out-of-band relay) may be used. In the first case, communication on the Uu and on the sidelink may be decoupled using different time slots as in time division duplex, TDD, systems.

FIG. 2 is a schematic representation of an in-coverage scenario in which two UEs directly communicating with each other are both connected to a base station. The base station gNB has a coverage area that is schematically represented by the circle 200 which, basically, corresponds to the cell schematically represented in FIGS. 1(a)-(b). The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a mode 1 configuration in NR V2X or as a mode 3 configuration in LTE V2X.

FIG. 3 is a schematic representation of an out-of-coverage scenario in which the UEs directly communicating with each other are either not connected to a base station, although they may be physically within a cell of a wireless communication network, or some or all of the UEs directly communicating with each other are to a base station but the base station does not provide for the SL resource allocation configuration or assistance. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 2 configuration in NR V2X or as a mode 4 configuration in LTE V2X. As mentioned above, the scenario in FIG. 3 which is the out-of-coverage scenario does not necessarily mean that the respective mode 2 UEs (in NR) or mode 4 UEs (in LTE) are outside of the coverage 200 of a base station, rather, it means that the respective mode 2 UEs (in NR) or mode 4 UEs (in LTE) are not served by a base station, are not connected to the base station of the coverage area, or are connected to the base station but receive no SL resource allocation configuration or assistance from the base station. Thus, there may be situations in which, within the coverage area 200 shown in FIG. 2, in addition to the NR mode 1 or LTE mode 3 UEs 202, 204 also NR mode 2 or LTE mode 4 UEs 206, 208, 210 are present.

In the above-described scenarios of vehicular user devices, UEs, a plurality of such user devices may form a user device group, also referred to simply as group, and the communication within the group or among the group members may be performed via the sidelink interfaces between the user devices, like the PC5 interface. For example, the above-described scenarios using vehicular user devices may be employed in the field of the transport industry in which a plurality of vehicles being equipped with vehicular user devices may be grouped together, for example, by a remote driving application. Other use cases in which a plurality of user devices may be grouped together for a sidelink communication among each other include, for example, factory automation and electrical power distribution. In the case of factory automation, a plurality of mobile or stationary machines within a factory may be equipped with user devices and grouped together for a sidelink communication, for example for controlling the operation of the machine, like a motion control of a robot. In the case of electrical power distribution, entities within the power distribution grid may be equipped with respective user devices which, within a certain area of the system may be grouped together so as to communicate via a sidelink communication with each other so as to allow for monitoring the system and for dealing with power distribution grid failures and outages.

Naturally, in the above-mentioned use cases sidelink communication is not limited to a communication within a group. Rather, the sidelink communication may be among any of UEs, like any pair of UEs.

It is noted that the information in the above section is only for enhancing the understanding of the background of the invention and therefore it may contain information that does not form known technology that is already known to a person of ordinary skill in the art.

Starting from a known technology as described above, there may be a need for improvements in the communication over the sidelink with or within a group of user devices.

SUMMARY

According to an embodiment, a wireless communication system may have: a plurality of user devices, UEs, and at least one logical group defined in accordance with one or more logical group criteria, the logical group including a plurality of member UEs to be connected via sidelink for sidelink communication with each other, wherein all member UEs of the logical group have assigned the same destination identification, ID, the destination ID being unique for the logical group.

According to another embodiment, a wireless communication system may have: one or more base stations, and a plurality of user devices, UEs, the UEs being aware about a logical group, e.g., a common and unique destination ID of the group, to be used for listening and/or transmitting critical information related to that geographical location, e.g., traffic lights information, traffic warnings, etc.

Another embodiment relates to a user device, UE, for a wireless communication system, the wireless communication system including a plurality of user devices, UEs, wherein the UE is a member UE of at least one logical group recognized or formed in the network, defined by an application and/or application assistance and/or the existing information within the network in accordance with one or more logical group criteria, the logical group including a plurality of member UEs to be connected via sidelink for sidelink communication with each other, wherein the UE has assigned the same destination identification, ID, like all other member UEs of the logical group, the destination ID being unique for the logical group.

Another embodiment relates to a user device for a wireless communication system, the wireless communication system including one or more base stations and a plurality of user devices, UEs, wherein the UE is aware about a logical group, e.g., a common and unique destination ID of the group, to be used for listening and/or transmitting critical information related to that geographical location, e.g., traffic lights information, traffic warnings, etc., and when being located in a certain geographical location or area within which a plurality of UEs are located, the UE is configured to receive form a base station a broadcast containing information about a logical group, e.g., a common and unique destination ID of the group, the base station providing one or more radio beams to cover the certain geographical location or area, the broadcast including the information.

Another embodiment relates to a base station for a wireless communication system, the wireless communication system including a plurality of user devices, UEs, wherein the base station is configured to serve one or more member UEs of at least one logical group recognized or formed in the network in accordance with one or more logical group criteria, the logical group including a plurality of member UEs to be connected via a sidelink for a sidelink communication with each other, wherein all member UEs of the logical group have assigned the same destination identification, ID, the destination ID being unique for the logical group.

Another embodiment relates to a base station for a wireless communication system, the wireless communication system including one or more base stations and a plurality of user devices, UEs, wherein the base station is configured to provide one or more radio beam to cover a certain geographical location or area within which a plurality of UEs are located so as to broadcast logical group information, e.g., a common and unique destination ID of the group, to UEs in the certain geographical location or area, the UEs being aware about a logical group, e.g., a common and unique destination ID of the group, to be used for listening and/or transmitting critical information related to that geographical location, e.g., traffic lights information, traffic warnings, etc.

According to another embodiment, a method in a wireless communication system having a plurality of user devices, UEs, may have the steps of: defining at least one logical group in accordance with one or more logical group criteria, the logical group including a plurality of member UEs to be connected via sidelink for sidelink communication with each other, and assigning to all member UEs of the logical group the same destination identification, ID, the destination ID being unique for the logical group.

According to another embodiment, a method in a wireless communication system having one or more base stations, and a plurality of user devices, UEs, may have the steps of: making the UEs being aware about a logical group, e.g., a common and unique destination ID of the group, to be used for listening and/or transmitting critical information related to that geographical location, e.g., traffic lights information, traffic warnings, etc., and providing or signaling one or more radio beams to cover a certain geographical location or area within which a plurality of UEs are located so as to broadcast in the certain geographical location or area information.

Another embodiment relates to a non-transitory digital storage medium having a computer program stored thereon to perform any of the inventive methods when said computer program is run by a computer.

BRIEF DESCRIPTION OF THE DRAWINGS

Embodiments of the present invention will be detailed subsequently referring to the appended drawings, in which:

FIG. 15 illustrates a SidelinkUEinformation RRC message that may be signaled to the base station by the UEs.

DETAILED DESCRIPTION OF THE INVENTION

Figure 1A:
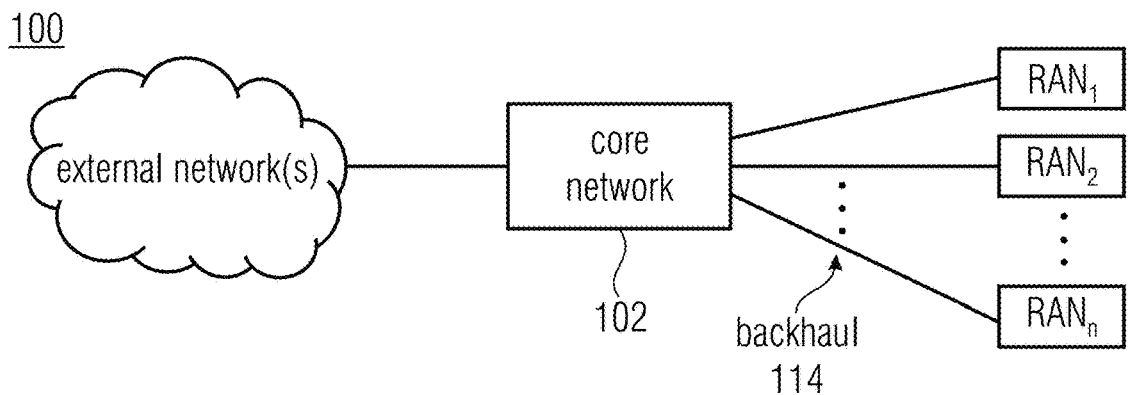
FIGS. 1(a)-(b) show schematic representations of an example of a wireless communication system.

Embodiments of the present invention are now described in more detail with reference to the accompanying drawings in which the same or similar elements have the same reference signs assigned.

The initial vehicle-to-everything (V2X) specification was included in LTE Release 14 of the 3GPP standard. The scheduling and assignment of resources had been modified according to the V2X requirements, while the original device-to-device (D2D) communication standard has been used as a basis of the design. Cellular V2X has been agreed to operate in two configurations from a resource allocation perspective, namely in the above-described mode 3 and mode 4 configurations. As mentioned above, in the V2X mode 3 configuration the scheduling and interference management of resources is performed by the base station for UEs so as to enable sidelink, SL, communications, like vehicle-to-vehicle communications. The control signaling is provided to the UE over the Uu interface, for example using the downlink control indicator, DCI, and is dynamically assigned by the base station. In the V2X mode 4 configuration the scheduling and interference management for SL communications is autonomously performed using distributed or decentralized algorithms among the UEs based on a preconfigured resource configuration. NR V2X supports similar to LTE a gNB-controlled sidelink communication, referred to as mode 1 (corresponds to LTE mode 3), as well as a distributed mode among UEs, which is referred to as mode 2 (corresponds to LTE mode 4). Note that NR mode 2 definition covers potential sidelink radio-layer functionality or resource allocation sub-modes a), b), c), d), (subject to further refinement including merging of some or all of them) where:
  a) UE autonomously selects sidelink resource for transmission,
  b) UE assists sidelink resource selection for other UE(s),
  c) UE is configured with NR configured grant (type-1 like) for sidelink transmission,
  d) UE schedules sidelink transmissions of other UEs.

Figure 1B:
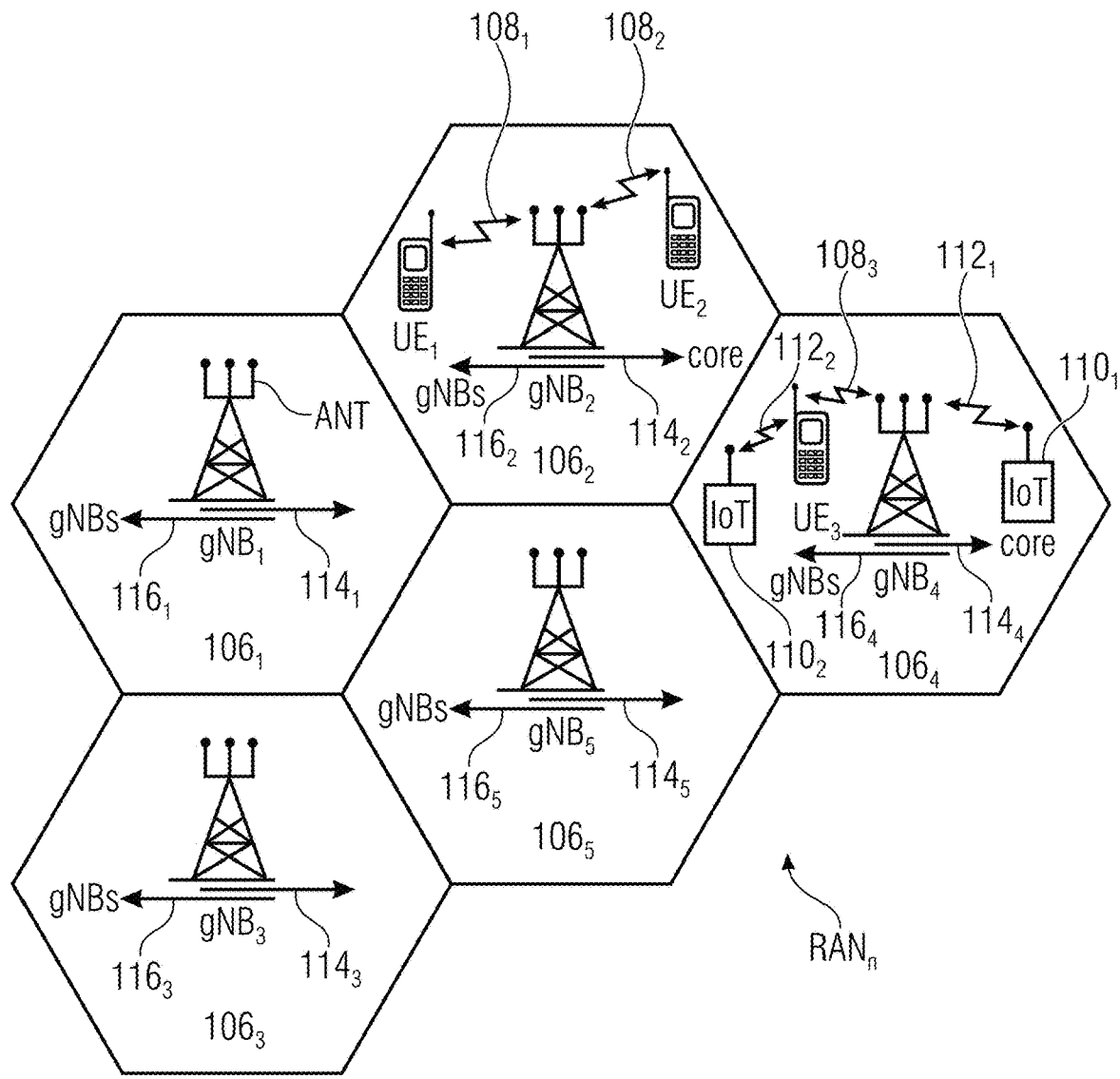
Figure 2:
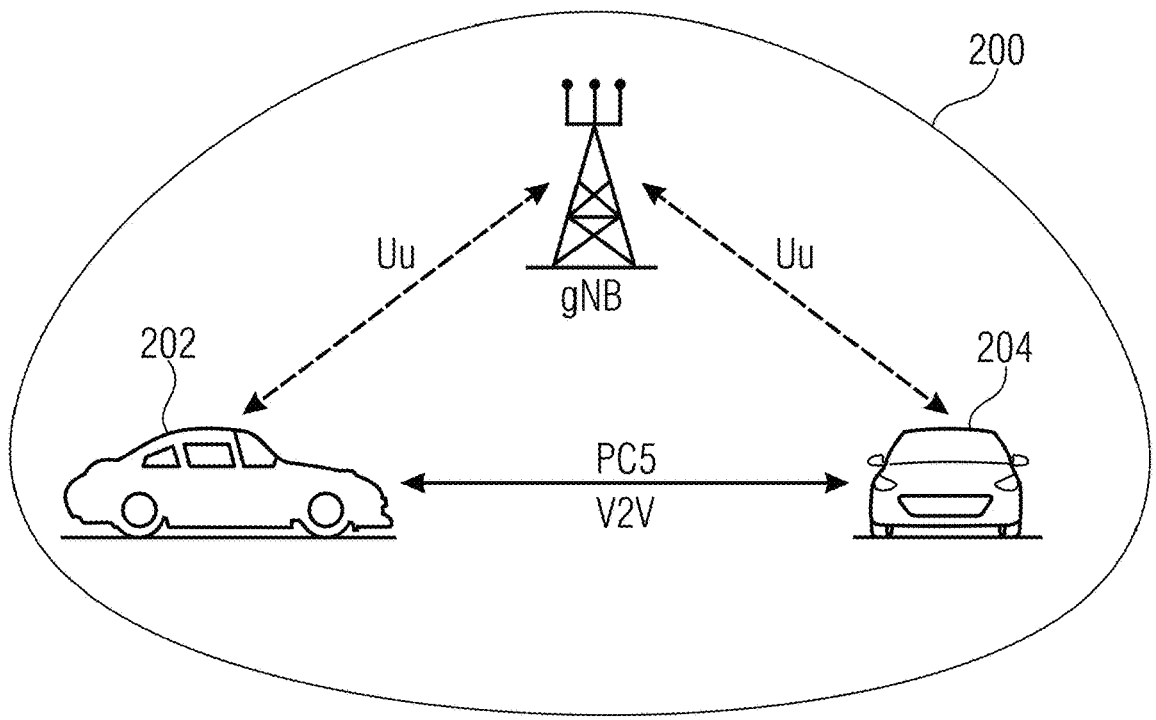
FIG. 2 is a schematic representation of an in-coverage scenario in which UEs directly communicating with each other are connected to a base station.
Figure 3:
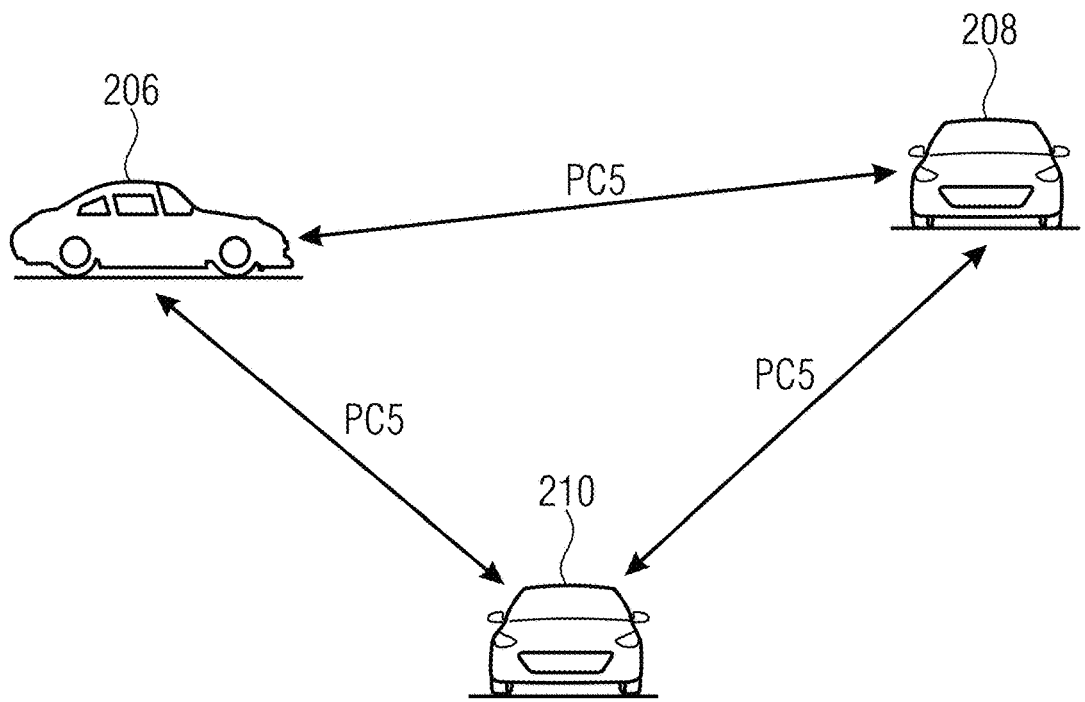
FIG. 3 is a schematic representation of an out-of-coverage scenario in which UEs directly communicating with each other receive no SL resource allocation configuration or assistance from a base station.
Figure 4:
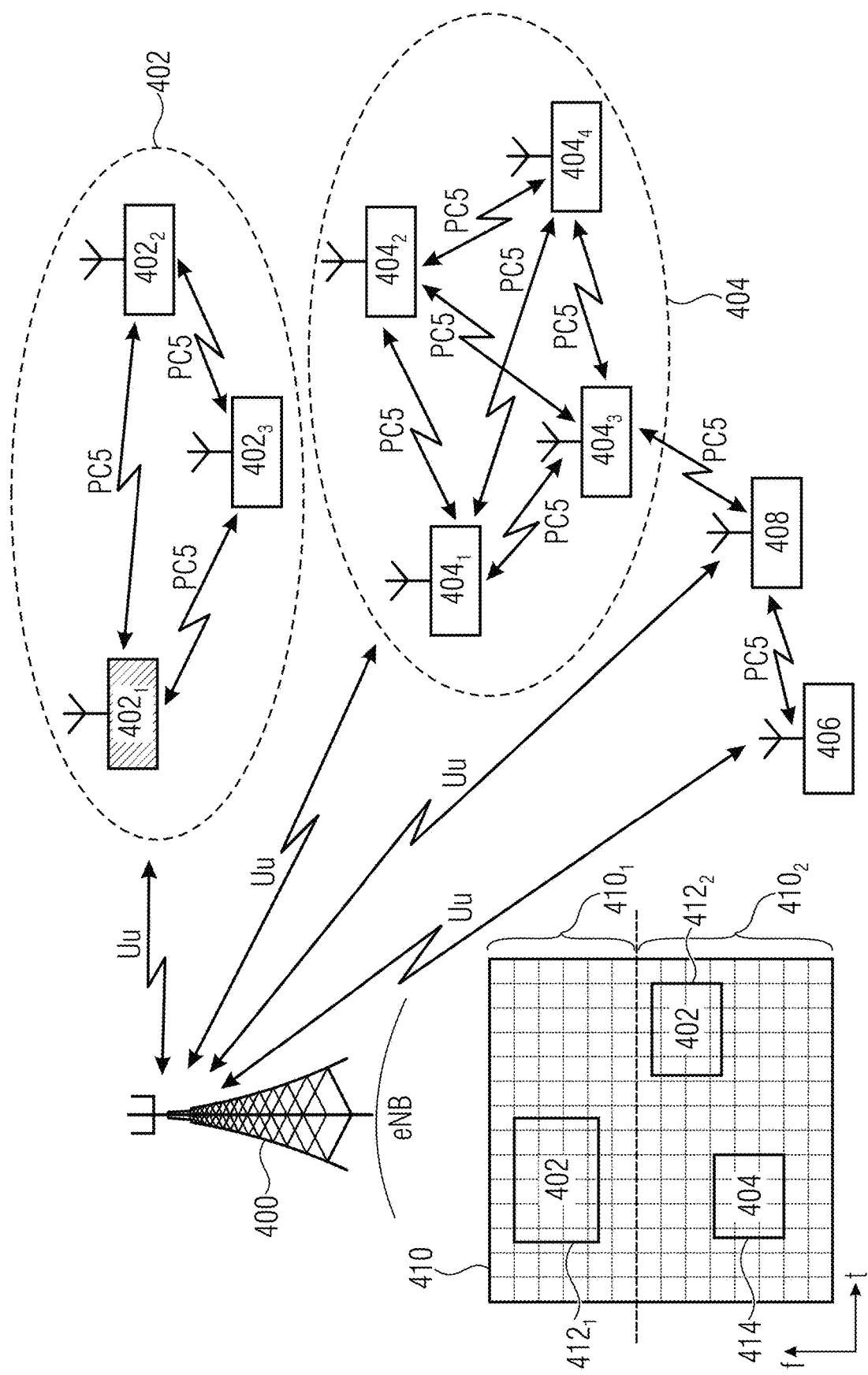
FIG. 4 is a schematic representation of a part of the wireless communication network, like the one of FIGS. 1(a)-(b), for describing the concept of providing a set of resources to be exclusively used for a groupcast communication.

FIG. 4 is a schematic representation of a part of the wireless communication network, like the one described with reference to FIGS. 1(a)-(b), and illustrates a cell of the network mentioned above or one of a plurality of radio access networks available in such a wireless communication network. FIG. 4 illustrates a base station 400 and a plurality of user devices, UEs. Some of the UEs are grouped into respective user device groups 402 and 404, while other UEs, like UEs 406 and 408 are not members of any group. The first group 402 includes, in accordance with the depicted example, three UEs $402_1$ to $402_3$, and within the group 402, the UEs $402_1$ to $402_3$ may communicate with each other using a sidelink interface, like the PC5 interface. The group 404 includes four UEs $404_1$ to $404_4$ which, like the UEs in the first group 402 communicate among each other using the sidelink communications via the sidelink interface, like the PC5 interface. The UEs within groups 402, 404 and the UEs 406, 408 may further communicate directly with the base station 400 using, for example, the Uu interface. Within the respective groups 402, 404, one of the UEs, some of the UEs or all of the UEs may communicate directly with the base station 400.

Also, UEs 406 and 408, which are not members of any group, may communicate with each other or with any other UE using the sidelink interface, like the PC5 interface.

For the sidelink communication a set of resources 410 is provided from which resources may be allocated to the respective UEs for transmitting data. The set of resources 410 is also referred to as a resource pool, a mini resource pool or a sub-pool. For example, the resources 410 include a time/frequency/space resource grid, and from the resources 410 a subset of resources are selected by the base station 400 (for UEs in NR mode 1) or by the UEs (for UEs in NR mode 2) for allocation to the respective UEs for a communication over the sidelink interface. In the example of FIG. 4, the base station 400 provides for the first group 402 two sets of resources or two mini resource pools $412_1$ and $412_2$ which include the resources from the overall resource pool 410 to be used for the sidelink communication within the group 402. For the second group 404, the base station 400 provides a second resource pool 414. It is noted that the present invention is not limited to the depicted embodiment, rather, there may be only a single group of UEs or there may be more than the two depicted groups. Also, the number of UEs forming the group is not limited to the depicted embodiments, rather, any number of UEs may be grouped together. Also, there may be situations in which all UEs are a member of a group and in such scenarios UEs 406 and 408 may not be present or may belong to one or more groups. Also, the number of mini resource pools 412, 414 reserved or provided for the respective groups may be different, for example, the base station may provide less or more mini resource pools for the group 402 or more than one resource pool 414 for the second group 404.

FIG. 4 illustrates an example in which the resource pool comprises a plurality of continuous resources across a frequency domain and adjacent across the time domain, however, the invention is not limited to such configurations, rather, in accordance with other embodiments, the respective resources forming a resource pool may be non-continuous resources across the frequency domain and/or non-adjacent resources across the time domain. Note that resources may also be allocated over the spatial domain utilizing multiple input multiple output (MIMO)-processing at the base station and/or at the UE. The spatial domain may be used in combination with both frequency and/or time domains. The resource pool may include a plurality of groups of resources including at least a first group and a second group, the first and second group having different numerologies, like a different subcarrier spacing, a different slot length or a different number of supported channels. For example, dependent on a quality of service, QoS, requirement, resources to be allocated may be selected from a mini resource pool with the numerology that may be used for meeting the QoS requirements. In accordance with other embodiments, the resource pool may include groups of resources with different numerologies, for example, a first group having a first numerology, as indicated at $410_1$, and a second group with a second numerology as indicated at $410_2$. For example, for group 402, the base station provides the mini resource pool 412 including resources from the first group of resources $410_1$ and from the second group of resources $410_2$. The groups of resources with different numerology may employ different subcarrier spacings, and the respective one or more groups of resources may be referred to as bandwidth parts (BWPs).

Figure 5:
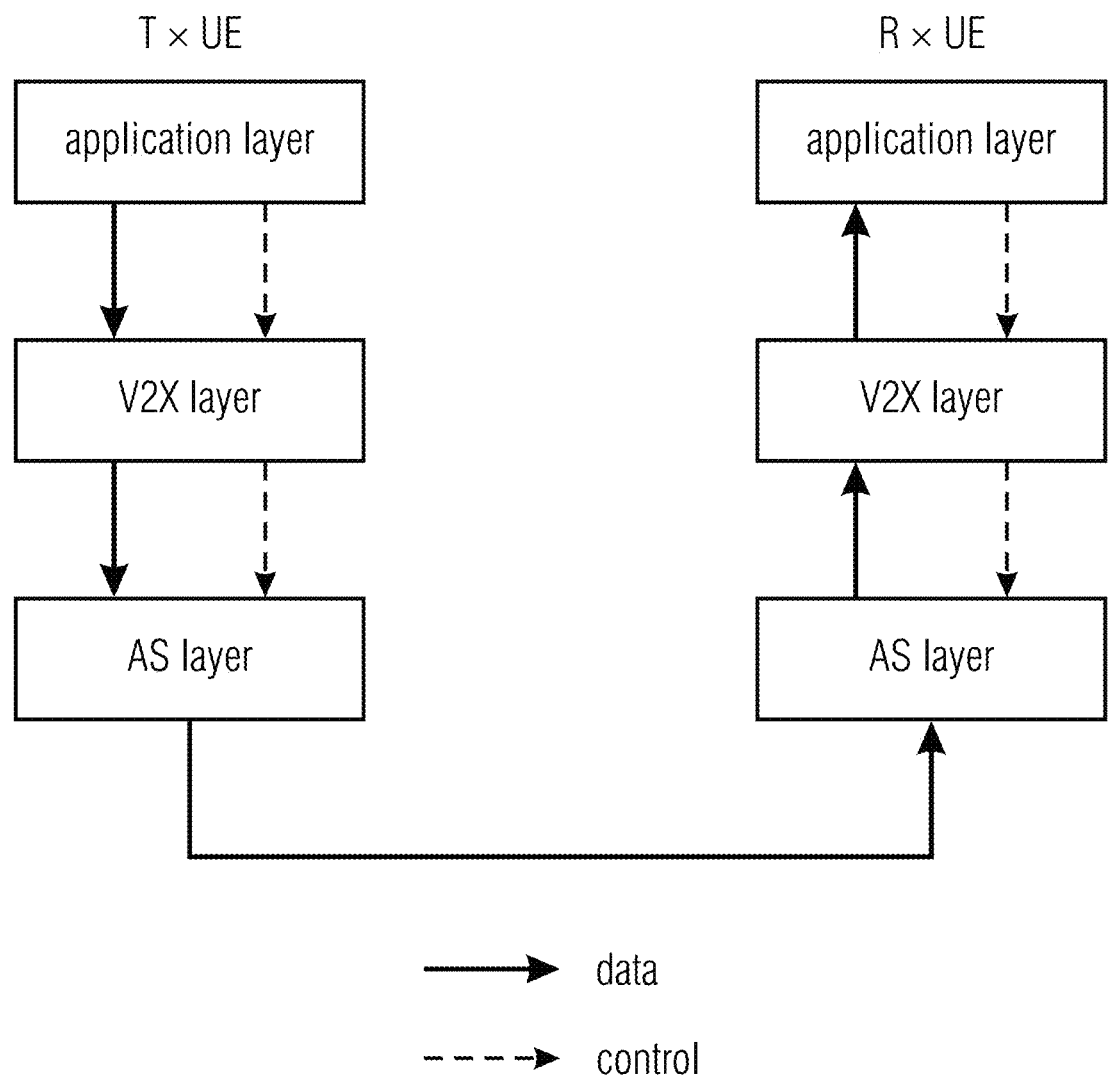
FIG. 5 shows a flow diagram for an end-to-end group communication using the above described group ID in accordance with reference [2]

For a communication with or within a group of UEs, referred to also as groupcast communication, some identification is needed, and some approaches suggest using a group ID which forms part of the control portion of a V2X control message, i.e., L1 destination ID (see for example reference [1]) or a Layer-2 destination ID or a destination ID provided by higher layers, e.g. application layer. The application layer is responsible for the group management and, therefore, is also responsible for the creation of the Group ID, which will be then passed down to the V2X layer. The V2X layer converts the Group ID into a Layer-2, L2, destination ID, which is passed from the V2X layer to the Access Stratum (AS) layer (see for example reference [2]). FIG. 5 shows a flow diagram for an end-to-end group communication using the above described group ID in accordance with reference [2]. The V2X layer is also responsible for tagging the data packets received from the application with the appropriate QoS settings. If there is no Group ID associated with a V2X service, a default Provider Service Identifier (PSID)/Intelligent Transport System (ITS)-Application Identifier (AID) mapping is applied at the V2X layer to determine the destination L2 IDs and corresponding QoS parameters (see reference [2]).

According to the LTE D2D and LTE V2X specification, the MAC header contains the Source (transmitting UE) and Destination (receiving UE) fields with a maximum length of 24 bits. In the case of a unicast transmission, the source and destination field of the MAC PDU corresponds to the ProSe UE ID, while for a groupcast transmission the destination field is the same as the 16 MSBs of the ProSe Layer-2 Group ID and identifies the destination of the group. The 24-bit ProSe Layer-2 Group ID is used to identify the group, with 16 MSBs in the MAC PDU and 8 LSBs filtered to the physical layer contained in the SCIO (D2D) for receiver selection, i.e., to identify if the data packet is intended for the receiver (see for example references [3] and [4]). However, a global uniqueness of the ProSe UE ID cannot be guaranteed and in case of conflicts, it has to be self-assigned responsive to the detection of a conflict.

In accordance with reference [1], range based groupcast communications may be used to support higher reliability communications for UEs in the group, which are within the useful range.

Figure 6:
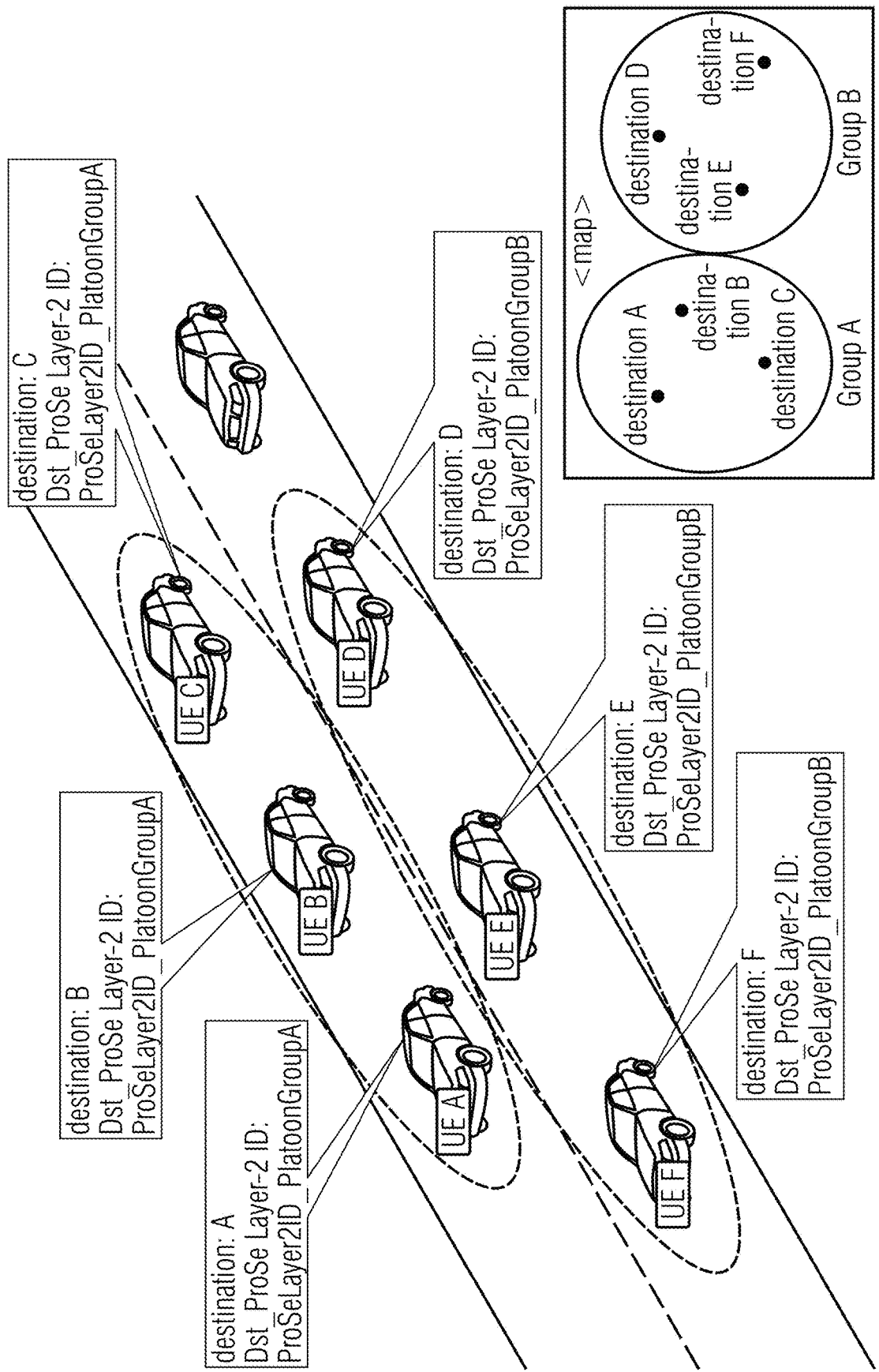
FIG. 6 illustrates a platooning assignment of a destination L2 ID in accordance with reference [5]

Reference [5] refers to the V2X group management, and each V2X application group may be mapped to a ProSe Layer-2 group ID in order to avoid any interference during PC5 communications for the V2X application groups. The ProSe Layer-2 Group ID is only used in PC5 V2X group communication without involvement of the V2X application server. FIG. 6 illustrates a platooning assignment of a destination L2 ID in accordance with reference [5].

Figure 7:
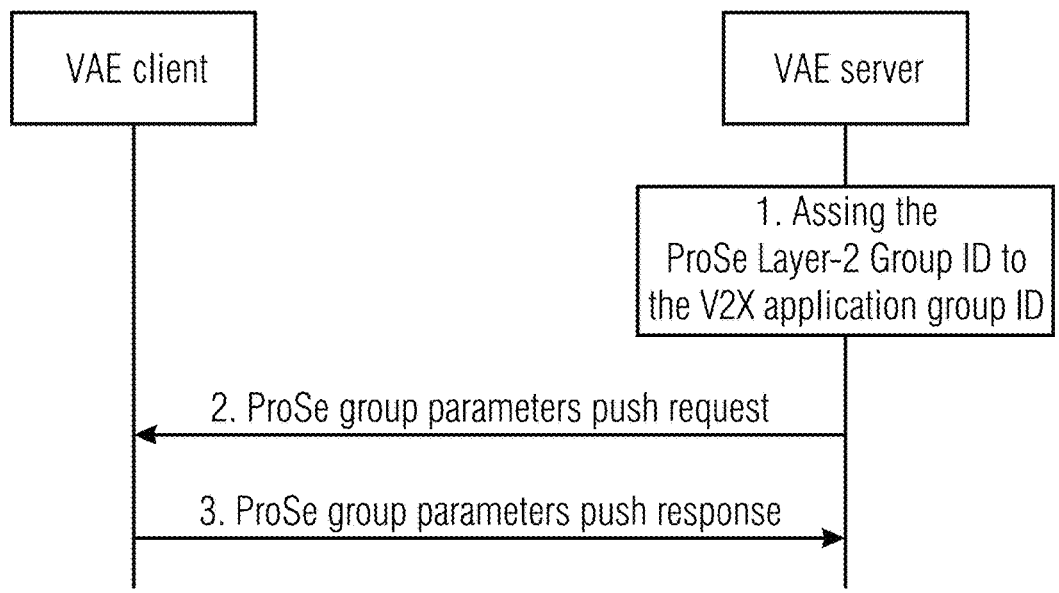
FIG. 7 illustrates how, in accordance with reference [5], a VAE server pushes the parameters for the V2X group communication over ProSe.

For example, the ProSe Layer-2 Group ID may be pushed by V2X application server. In this case, the V2X application group management, e.g., group creation, membership management and the like, is within the responsibility of the V2X application specific server. The V2X group information is provided to the Vehicle Application Enabler, VAE, server. The VAE server assigns a ProSe Layer-2 Group ID from the ProSe Layer-2 Group ID pool to a V2X application group ID. The VAE server then delivers the assignment of the ProSe Layer-2 Group ID and the V2X application group ID to the VAE client, as is shown in FIG. 7 illustrating how, in accordance with reference [5], a VAE server pushes the parameters for the V2X group communication over ProSe.

Figure 8:
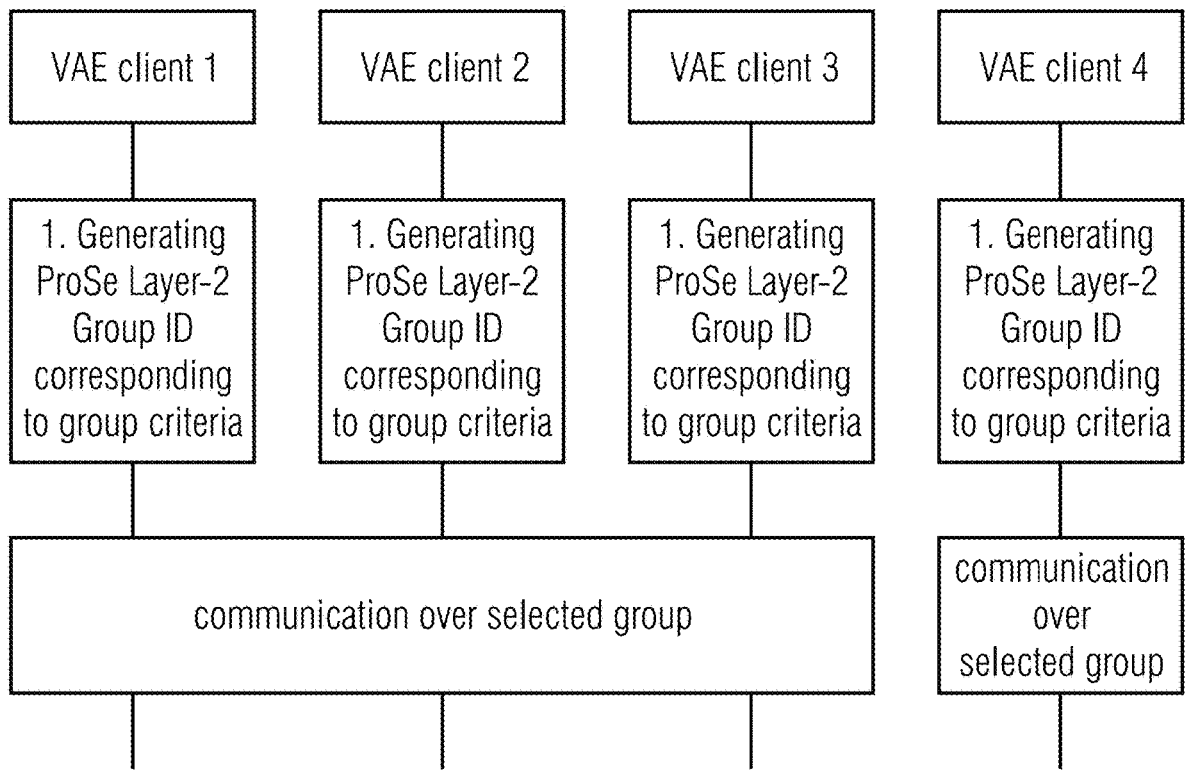
FIG. 8 illustrates the generation of a platoon-based destination L2 ID in accordance with reference [5]

In accordance with other examples, reference [5] provides for an autonomous decision for assigning the ProSe Layer-2 Group ID, as is shown in FIG. 8 illustrating the generation of a platoon-based destination L2 ID in accordance with reference [5]. The UE may be configured with rules to be able to generate an appropriate ProSe Layer-2 Group ID for platooning by the V2X Application Server. When the V2X client decides to start platooning, it generates the ProSe Layer-2 Group ID based on the configured rules corresponding to V2X UE's destination. The V2X layer then generates this group destination L2 ID based on the platooning/group criteria.

As mentioned above, NR V2X includes a set of advanced use cases to be achieved including vehicle platooning, extended sensor sharing, advanced driving, remote driving and others. The use cases, like platooning, involve that the members of the group or platoon are able to communicate with each other over very short distances, but with a high level of reliability and very low latency. Unicast, multicast, groupcast and broadcast communications may be provided in NR V2X, of which groupcast communications is a key enabler for implementing the respective use cases. In the context of groupcast communications further improvements are needed, e.g., with regard to the Group ID and the Member ID management or with regard to the centralized handling of groupcast communications.

Figure 9:
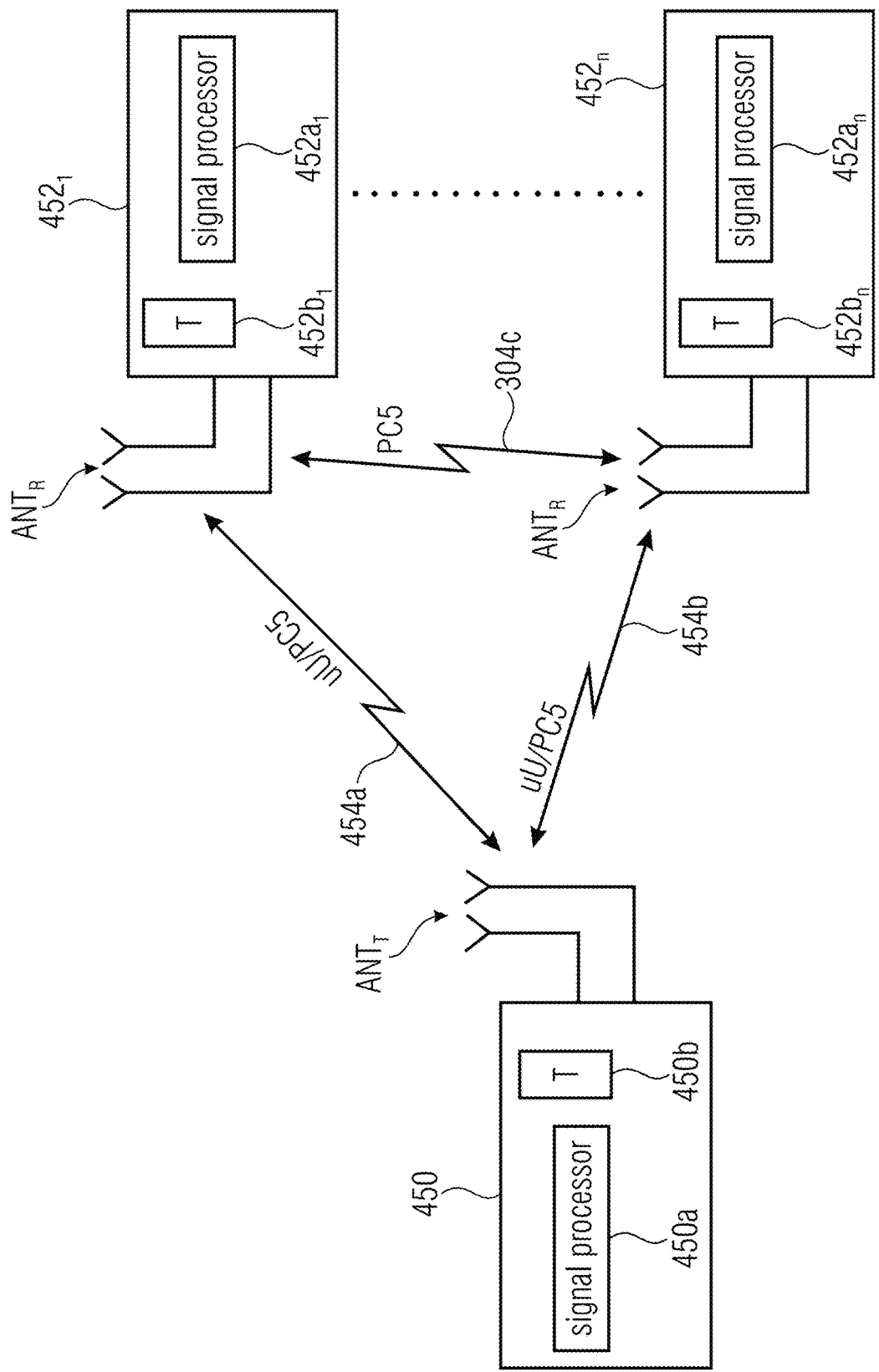
FIG. 9 is a schematic representation of a wireless communication system including a transmitter, like a base station, and one or more receivers, like user devices, UEs.

The present invention addresses the above issues by providing improvements in the communication over the sidelink as well as improvements in the handling of feedback in the sidelink. Embodiments of the present invention may be implemented in a wireless communication system as depicted in FIGS. 1(a)-(b), FIG. 2, FIG. 3 and FIG. 4 including base stations and users, like mobile terminals or IoT devices. FIG. 9 is a schematic representation of a wireless communication system including a transmitter 450, like a base station, and one or more receivers $452_1$ to $452_n$, like user devices, UEs. The transmitter 450 and the receivers 452 may communicate via one or more wireless communication links or channels 454a, 454b, 454c, like a radio link. The transmitter 450 may include one or more antennas $ANT_T$ or an antenna array having a plurality of antenna elements, a signal processor 450a and a transceiver 450b, coupled with each other. The receivers 452 include one or more antennas $ANT_R$ or an antenna array having a plurality of antennas, a signal processor $452a_1$, $452a_n$, and a transceiver $452b_1$, $452b_n$ coupled with each other. The base station 450 and the UEs 452 may communicate via respective first wireless communication links 454a and 454b, like a radio link using the Uu interface, while the UEs 452 may communicate with each other via a second wireless communication link 454c, like a radio link using the PC5 interface. When the UEs are not served by the base station, are not be connected to a base station, for example, they are not in an RRC connected state, or, more generally, when no SL resource allocation configuration or assistance is provided by a base station, the UEs may communicate with each other over the sidelink. The system, the one or more UEs 452 and the base stations may operate in accordance with the inventive teachings described herein.

Wireless Communication System

In accordance with a $1^{st}$ aspect, the present invention provides a wireless communication system, comprising
a plurality of user devices, UEs, and
at least one logical group defined in accordance with one or more logical group criteria, the logical group including a plurality of member UEs to be connected via sidelink for sidelink communication with each other, wherein all member UEs of the logical group have assigned the same destination identification, ID, the destination ID being unique for the logical group.

In accordance with embodiments the one or more logical group criteria include one or more of:
an initial size of the group,
a duration of the group,
a final position, like an end point or destination of the group,
a set of waypoints/vector of positions,
a UE speed or velocity,
a range, e.g., UEs sharing the same location or being in proximity to each other,
QOS requirements,
CSI, RSSI, RSRQ, RSRP UE measurements,
a range within which a base station or a UE transmit, and a position or direction or context and/or a speed or velocity of UEs within the range,
UEs are temporarily within a certain geographical location or area or in proximity to certain infrastructure, e.g. RSU, traffic lights, etc. and have the same attributes, like direction or context and/or a range of speed or velocity.

In accordance with embodiments wherein the logical group criterion or a combination of the logical group criteria are used to form the logical group from a network perspective.

In accordance with embodiments wherein the logical group is managed by an application server, like a V2X Application Enabler, VAE, server, the application server assigning the unique destination ID for the logical group, wherein the application server may be located outside or inside the wireless communication system, or one or more of the plurality of UEs may host the application server.

In accordance with embodiments the application server handles the joining of a new UE to the logical group and the assignment of the unique destination ID to a new UE, and the leaving of a member UE and the revocation of the unique destination ID from the leaving of a member UE.

In accordance with embodiments wherein the logical group is managed by one or more of the plurality of UEs, the UEs configured with rules for generating the unique destination ID for the logical group using the one or more logical group criteria.

In accordance with embodiments, in case one of the member UEs is to perform a transmission within the logical group, the transmitting member UE is configured to generate a source ID, e.g., by the application layer or the V2X layer, wherein, for generating the source ID, the transmitting member UE is configured to consider source IDs of current or existing transmitting member UEs so as to generate or select a different source ID.

In accordance with embodiments, in case two transmitting member UEs generate or select the same source ID, the conflict in source IDs.
is detected and resolved by the application layer, or
responsive to a request for transmitting resources by transmitting member UEs, an entity of the wireless communication system for allocating and scheduling resources, like a gNB, is configured to detect the conflict, e.g. based on the Source UE ID and/or C-RNTI or the conflict is reported by a member UE of the logical group, and to signal to at least one of the transmitting member UEs a notification about the source ID conflict, and
is detected by member UE (in out-of-coverage case), wherein the at least one transmitting member UE is configured to generate or select a new source ID.

In accordance with embodiments, wherein any conflict between logical groups using the same unique destination ID is resolved by one or more of the applications defining the logical groups.

In accordance with embodiments, comprises a group supervisor, the group supervisor knowing or being configured to collect the unique destination IDs of some or all the UEs being a member of one or more logical groups.

In accordance with embodiments the group supervisor includes one or more network entities of the wireless communication system, e.g., a base station, and/or a UE, and/or a network component, like a core network function.

In accordance with embodiments the group supervisor is a base station, when the member UEs of the logical group are in-coverage and operate either in RRC_Idle, RRC_Inactive or RRC_Connected mode, and member UEs of the same logical group intending to perform a SL communication within the logical group are configured to signal the intention for the SL communication to the base station via an message, e.g., a sidelinkUEinformation RRC message.

In accordance with embodiments the message includes at least a first information element and a second information element,
the first information element indicating the single unique destination ID that describes the all the members of the logical group, and
the second information element indicating whether the transmission is for a groupcast for the logical group and indicating a logical group ID,
wherein the one or more logical groups are inferred by the base station from the first information element, or the one or more logical groups are indicated to the base station by a member UE requesting resources for the SL communication using the second information element, and
wherein the base station is configured to provide the resources for the SL communication within the logical group accordingly based on the existence of the logical group, wherein the resources may be from a dedicated resource set, e.g., a mini-resource pool for SL.

In accordance with embodiments the group supervisor is a member UE of the logical group.

In accordance with embodiments the member UE of the logical group that becomes the group supervisor is called a group-leader or GL UE of the logical group.

In accordance with embodiments the GL UE is configured to recognize and collect source IDs of the member UEs of the logical group configured to perform a multicast transmission within the logical group, wherein the GL UE and all other member UEs of the logical group have the same unique destination ID.

In accordance with embodiments the GL UE is configured to recognize and collect the source IDs via
PC5-RRC signaling, or
SCI on the physical SL control channel.

In accordance with embodiments the GL UE is configured to recognize and collect the source IDs only for traffic
having a priority exceeding a certain threshold, like traffic with high QoS requirements, and/or of a certain type, like SPS or OS traffic,
wherein for traffic the member UEs may sense the source IDs from the resource set used for the SL communication.

In accordance with embodiments, when being in-coverage, the GL UE is configured to communicate with the base station on behalf of the whole logical group, e.g., to request resources for the SL communication from another transmitting member UE of the logical group sending its resource requests to the GL UE.

In accordance with embodiments the GL UE is selected
by the application layer so that member UEs are aware of the GL UE in their own application layer, or
by the application layer as a configuration to the UEs, or
by the application layer as pre-set or pre-configured rules on the priority of source IDs for being the GL UE, or
by one or more entities of the wireless communication system.

In accordance with embodiments a member UE of the logical group that initiates a first groupcast within the logical group is the GL UE, at least initially, and all member UEs being the destination of the first groupcast recognize that transmitting member UE as the GL UE, wherein the GL UE may signal its existence to the whole logical group, e.g., periodically or at certain intervals.

In accordance with embodiments the GL UE is configured to
signal its existence to the whole logical group, e.g., periodically or at certain intervals, and
in case the current GL UE is disconnected or disappears or in case the current GL UE wants to stop being the GL UE, a new GL UE is defined by
a negotiation among the remaining member UEs, or
a stored configuration indicating one or more member UEs to be the new GL UE, e.g., by selecting a member UE from a list.

In accordance with embodiments, in case the current GL UE wants to stop being the GL UE of a group, the current GL UE is configured to
signal a request to a member UE having a source ID,
responsive to receiving from the member UE a confirmation that it will become the new GL UE,
signal to the member UEs the new GL UE, and
step down from being the GL UE and the other member UE becomes the new GL UE,
wherein the current GL UE may share with or transfer to the new GL UE group information that it had collected as the leader.

In accordance with embodiments the destination ID being unique for the logical group is a layer 2 ID, e.g., access stratum (AS) layer ID, the layer 2 ID having a structure including:
a part that refers to or implies a logical group ID for the logical group or as inferred from the logical group criteria, and
a part that refers to or implies a layer 1 ID, like a physical layer ID.

In accordance with embodiments the layer 2 ID structure further includes a part that refers to or implies a geographical or zone ID indicating a geographical region where the member UE is located, e.g., a 4-bit field corresponding to Zone IDs from 1 to 8 may be provided.

In accordance with embodiments a groupcast transmission to the member UEs of the logical group comprises
a SL groupcast originating from one of the member UEs of the logical group, or
a SL groupcast originating from a UE outside the logical group, or
a Uu groupcast originating from a base station.

In accordance with embodiments the member UEs are located in different zones of the base station coverage area, and wherein the base station is configured to provide a resource set, lie a resource pool, RP, or a mini-RP, for the SL communication within the logical group for the different zones.

In accordance with a $2^{nd}$ aspect, the present invention provides a wireless communication system, comprising
one or more base stations, and
a plurality of user devices, UEs, the UEs being aware about a logical group, e.g., a common and unique destination ID of the group, to be used for listening and/or transmitting critical information related to that geographical location, e.g., traffic lights information, traffic warnings, etc.

In accordance with embodiments a base station is configured to provide or signal one or more radio beams to cover a certain geographical location or area within which a plurality of UEs are located so as to broadcast in the certain geographical location or area information.

In accordance with embodiments a UE is pre-configured with the logical group information for a specific geographical location or area.

In accordance with embodiments the IDs are shuffled or modified based on a pre-defined set of criteria, e.g., for maintaining privacy and security of the logical group In accordance with embodiments the shuffling is performed based on an agreed or signaled algorithm, and/or based on a shuffling timer indicating a validity of the ID.

In accordance with embodiments the IDs to be shuffled include one or more of the following: a source UE ID, a L2 destination ID, a L1 destination ID, and/a or logical group ID.

In accordance with embodiments the UE comprises one or more of a mobile terminal, or stationary terminal, or cellular IoT-UE, or vehicular UE, or vehicular group leader (GL) UE, or an IoT or narrowband IoT, NB-IoT, device, or a ground based vehicle, or an aerial vehicle, or a drone, or a moving base station, or a road side unit, or a building, or any other item or device provided with network connectivity enabling the item/device to communicate using the wireless communication network, e.g., a sensor or actuator, and wherein the base station comprises one or more of a macro cell base station, or a small cell base station, or a central unit of a base station, or a distributed unit of a base station, or a road side unit, or a UE, or a group leader (GL), or a relay or a remote radio head, or an AMF, or an SMF, or a core network entity, or mobile edge computing entity, or a network slice as in the NR or 5G core context, or any transmission/reception point, TRP, enabling an item or a device to communicate using the wireless communication network, the item or device being provided with network connectivity to communicate using the wireless communication network.

UEs

In accordance with the $1^{st}$ aspect, the present invention provides a user device, UE, for a wireless communication system, the wireless communication system including a plurality of user devices, UEs, wherein
the UE is a member UE of at least one logical group recognized or formed in the network, defined by an application and/or application assistance and/or the existing information within the network in accordance with one or more logical group criteria, the logical group including a plurality of member UEs to be connected via sidelink for sidelink communication with each other, wherein the UE has assigned the same destination identification, ID, like all other member UEs of the logical group, the destination ID being unique for the logical group.

In accordance with the $2^{nd}$ aspect, the present invention provides a user device for a wireless communication system, the wireless communication system including one or more base stations and a plurality of user devices, UEs, wherein the UE is aware about a logical group, e.g., a common and unique destination ID of the group, to be used for listening and/or transmitting critical information related to that geographical location, e.g., traffic lights information, traffic warnings, etc., and when being located in a certain geographical location or area within which a plurality of UEs are located, the UE is configured to receive form a base station a broadcast containing information about a logical group, e.g., a common and unique destination ID of the group, the base station providing one or more radio beams to cover the certain geographical location or area, the broadcast including the information.

In accordance with embodiments the wireless communication system is an inventive wireless communication system.

Base Stations

In accordance with the $1^{st}$ aspect, the present invention provides a base station for a wireless communication system, the wireless communication system including a plurality of user devices, UEs, wherein the base station is configured to serve one or more member UEs of at least one logical group recognized or formed in the network in accordance with one or more logical group criteria, the logical group including a plurality of member UEs to be connected via a sidelink for a sidelink communication with each other, wherein all member UEs of the logical group have assigned the same destination identification, ID, the destination ID being unique for the logical group.

In accordance with the $2^{nd}$ aspect, the present invention provides a base station for a wireless communication system, the wireless communication system including one or more base stations and a plurality of user devices, UEs, wherein the base station is configured to provide one or more radio beam to cover a certain geographical location or area within which a plurality of UEs are located so as to broadcast logical group information, e.g., a common and unique destination ID of the group, to UEs in the certain geographical location or area, the UEs being aware about a logical group, e.g., a common and unique destination ID of the group, to be used for listening and/or transmitting critical information related to that geographical location, e.g., traffic lights information, traffic warnings, etc.

In accordance with embodiments the wireless communication system is an inventive.

Method

In accordance with the $1^{st}$ aspect, the present invention provides a method in a wireless communication system having a plurality of user devices, UEs, the method comprising:

defining at least one logical group in accordance with one or more logical group criteria, the logical group including a plurality of member UEs to be connected via sidelink for sidelink communication with each other, and assigning to all member UEs of the logical group the same destination identification, ID, the destination ID being unique for the logical group.

In accordance with the $2^{nd}$ aspect, the present invention provides a method in a wireless communication system having one or more base stations, and a plurality of user devices, UEs, the method comprising:

making the UEs being aware about a logical group, e.g., a common and unique destination ID of the group, to be used for listening and/or transmitting critical information related to that geographical location, e.g., traffic lights information, traffic warnings, etc., and providing or signaling one or more radio beams to cover a certain geographical location or area within which a plurality of UEs are located so as to broadcast in the certain geographical location or area information.

Computer Program Product

The present invention provides a computer program product comprising instructions which, when the program is executed by a computer, causes the computer to carry out one or more methods in accordance with the present invention.

Thus, the present invention improvements in the communication over the sidelink with or within a group of user devices. A first aspect of the present invention addresses the Group ID and the Member ID management, e.g., identifying the group on a communication level, i.e. after the V2X layer, e.g. PDPC, RLC, MAC or PHY, the relationship and mapping of Layer-2, L2, IDs to Layer-1, L1, IDs, bearing in mind that L2 and L1 IDs are constrained by size (number of bits to be used), the selection of L2 IDs, from which the L1 ID may be implicitly derived, for in-coverage scenarios, where the gNB assists in the management of the group, as well as for out-of-coverage scenarios. For in-coverage scenarios, the gNB may inform all members of a unique group ID. For out-of-coverage cases, IDs have to be pre-configured, negotiated, assigned by another UE, randomly selected or implicitly derived, and due to maintaining the privacy and security of the logical group, another aspect is shuffling of IDs based on a pre-defined set of criteria. The shuffling can be performed based on an agreed/signaled algorithm and can be based on a shuffling timer, indicating the validity of the ID. IDs to be shuffled can be one or more of the following: source UE ID, L2 destination ID, L1 destination ID, and/or logical group ID. A shuffling trigger/announcement can be send by another UE, a GL UE, a supervisor UE, a BS, a RSU or other entities which are aware of the existence of the logical group.

Figure 10:
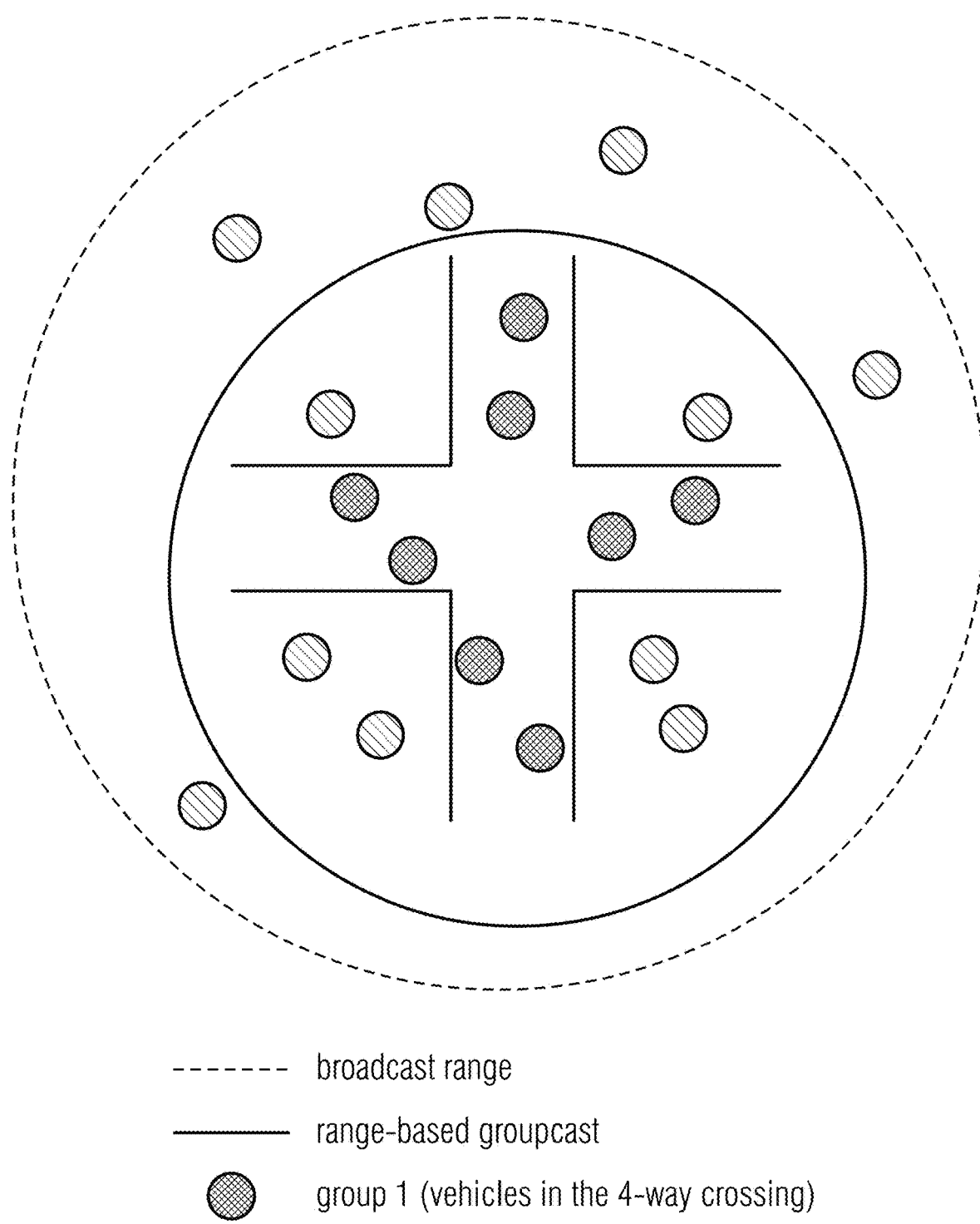
FIG. 10 illustrates a range-based groupcast formation as described, e.g., by reference [1]

A second aspect of the present invention suggests decentralized groupcast communications. For example, a group leader, GL, like a GL UE may be used to lead corresponding member UEs of the group, e.g., in platooning use case. This communication may be in the form of a star topology (one-to-many configuration) and may be regarded as group-based groupcast communications, also referred to as a groupcast communication within the group or a group internal multicast communication. Instead of communication with all member UEs over the sidelink, SL, the SL communication may only with a subset of the member UEs as schematically shown in FIG. 10 illustrating a range-based groupcast formation as described, e.g., by reference [1]. In this case the communication may be in the form of a mesh topology, where UEs periodically communicate with each other based on defined criteria, e.g., range and implied context, e.g., UEs approaching a traffic 4-way crossing or in case of a certain road event.

Aspect (1)

Embodiments of the first aspect of the present invention provide new group communication procedures, and a first embodiment concerns the Layer-1 and Layer-2 Destination Group ID and the UE ID management.

So far, in wireless communication networks or systems the 3GPP layer is agnostic to the existence of a group such as a V2X platoon. If desired, e.g., for optimized operations, a separation of the traffic from different groups may be achieved by using different destination L2 IDs. These destination L2 IDs may be negotiated among the group members at the application layer or may be obtained from the V2X AS at the application layer. For such operations, the application layer decides the L2 ID and pass it down, together with the packets, to the 3GPP layer. In this case, PSID to L2 ID mapping is not used in deciding on the destination L2 ID (see for example reference [2], clause 6.1). Further, as described above, reference [5] suggest mechanisms to assign and/or push a common destination L2 ID to UEs that are members of a group, e.g., a platoon. In addition, as described in reference [2], the 3GPP core network supports multicast, also called groupcast, e.g. for V2X, but the multicast is a communication from a source to a group of destinations.

Currently, there are no mechanisms for indicating at the lower layers (Layer-2 and Layer-1) that a transmission is a groupcast communication, e.g., a transmission directed toward a platooning-based groupcast communication. In other words, the network may be aware of a multicast and handles it, but the network does not distinguish if this multicast will be taking place among the members of a group, e.g., a platoon. So far, the group to which a multicast is directed includes one fixed source, the transmitting UE, and a static or semi-static number of destinations, the one or more other group members. For the network or from a network's perspective, each combination of source (transmitting UE) and destinations (receiving UEs) is treated as separate multicast with a unique destination ID. In the setup of a group size of n UEs, this results in n separate multicast transmissions unique for each source UE.

Figure 11:
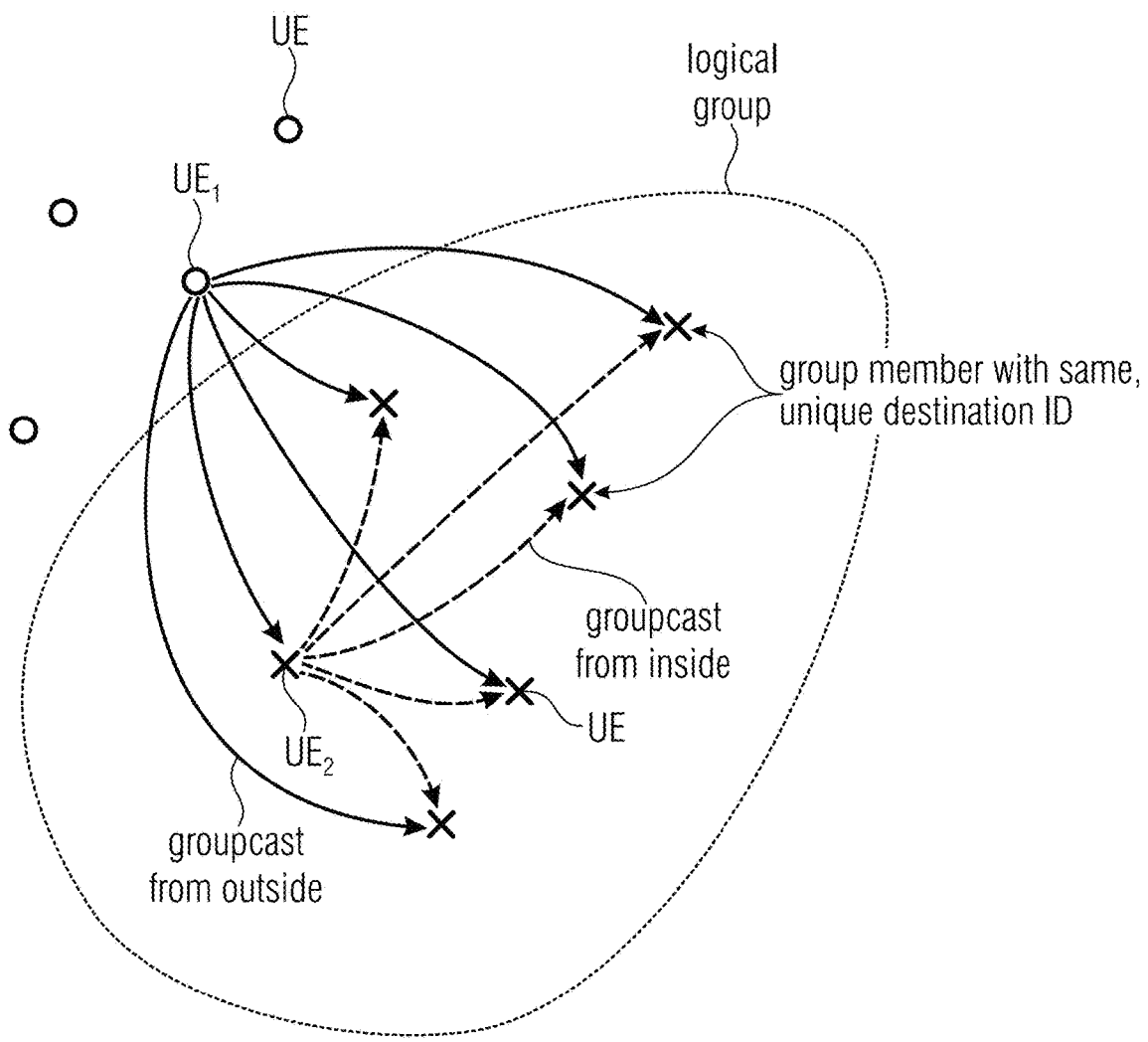
FIG. 11 illustrates an embodiment of the inventive concept using an identical destination ID, which is unique for the logical group, for all UEs of the logical group.

Embodiments of the present invention introduce a logical group and all member UEs of the logical group have assigned the same destination ID or address, which is unique for the logical group. In other words, all member UEs of the logical group have an identical destination ID, which is unique for the logical group. FIG. 11 illustrates an embodiment of the inventive concept using an identical destination ID, which is unique for the logical group, for all UEs of the logical group. In FIG. 11 a wireless communication system is schematically illustrated, more specifically, a plurality of UEs represented by Os and Xs. The UEs represented by Xs are members of a logical group, while UEs represented by Os are no member of this logical group (they may be a member of another group or not). The inventive approach allows using the common, unique destination ID for a communication from one UE to the member UEs (groupcast), either from outside the group, e.g., by UE1 not being member of this logical group, of from inside, e.g., by member UE2.

In accordance with embodiments, a logical group may be formed of a plurality of user devices, UEs, and all members of the logical group are group destination UEs. At the same time, one or more members of the logical group or multiple external entities, such as a UE/UEs, e.g. another vehicle driving along the same road, or one or more of RSUs, may be source UEs and each source UE may perform a groupcast, or equivalently a multicast, communication to all members of the group except the source UE itself. In this configuration for each particular source UE, all other UEs, which may include other source UEs, are the destination UEs of the groupcast.

For example, UEs may be grouped together in the logical group dependent on certain attributes of the UEs, which may be defined by an application using the UEs. In the platooning use case, vehicles traveling together along a road towards a common destination are the member of the application group. The application may push a unified destination ID to these UEs or alternatively configures them so a unified destination ID is generated by these UEs. These UEs form a logical group (described in more detail below) so that, e.g., for a communication from a platoon member to the other platoon members only the one same destination address is to be used. Thus, an application level group, like a platoon, either completely or a part of thereof, may be considered a logical group in the communication network. From a network perspective this may be beneficial as the network may select and manage the logical group based on the performance of the network, since the application has no knowledge about the physical network parameters. In this embodiment the application group and the logical group are the same.

In accordance with other examples, the network may use the information it inherently has or may have, like one or more of communication patterns, measurements, geographical location, context, direction, speed or velocity of UEs, to infer or define a logical group in the network according to one or some logical group criteria.

Examples are:
Platoon: Group of vehicles having the same route,
Vehicles approaching a road junction,
Vehicles driving for a part of their route along the same road,
Vehicles being in proximity to each other.

In this embodiment the logical group can be formed irrelevant to any application group.

In accordance with embodiments, the logical group may be defined or formed, e.g., by the application or the GL UE or a UE, using or applying one or more or a combination of the following logical group criteria:
an initial size of the group,
a duration of the group,
a final position, like an end point or destination of the group,
a set of waypoints/vector of positions,
a UE speed or velocity,
a range, e.g., UEs sharing the same location or being in proximity to each other,
QoS requirements,
CSI, RSSI, RSRQ, RSRP UE measurements,
a range within which a base station or a UE transmit, and a position or direction or context and/or a speed or velocity of UEs within the range,
UEs are temporarily within a certain geographical location or area or in proximity to certain infrastructure, e.g. RSU, traffic lights, etc. and have the same attributes, like direction or context and/or a range of speed or velocity,
a vehicular type,
e.g. UEs belonging to the same brand (e.g. Volkswagen, BWM, Daimler), e.g. UEs belonging to the same vehicular class, e.g. truck, sports-utility-vehicle (SUV), etc., a classification based on a contract/subscription, e.g. gold, silver, bronze UE depending on its status based on a business contract, e.g. payment plan.

For example, depending on the criteria, the information that may be used to recognize a logical group within the network or equivalently at the network level, may exist or be available inherently within the network or may be passed down from application or may be a combination of both types of information. In other words, using a logical group criterion or a combination of logical group criteria the logical group is formed from a network perspective, like from the perspective of the physical layer, MAC layer RLC, PDCP, IP.

In accordance with embodiments, at least two UEs are used to form a logical group so that the at least two UEs may communicate using a groupcast communication. Although a communication from one of the UEs to the other UE may be performed using a unicast transmission, creating the logical group is advantageous as additional UEs may readily join the group by simply assigning the unique destination ID so that, with a reduced signaling overhead, also the new UE receives the groupcast transmissions. In accordance with other embodiments, a threshold of a minimum number of UEs that may be used to form a logical group may be set. In almost the same manner, a maximum threshold can be used to limit the number of UEs forming a logical group, which can be hard-coded or signaled.

For example, a logical group may be recognized or formed by the network according to the location of the UEs, their proximity to certain infrastructure, e.g. RSU, traffic lights, etc., their direction and velocity, in case UEs in certain location and with certain range of speed need to groupcast to other UEs with the same attributes. Another example where a logical group is recognized by the network, is when based on the information that are passed down from application layer to the V2X layer, several UEs are assigned the same group destination ID, e.g. the destination L2 ID, or are configured in way that they generate the same group destination ID. Among these UEs, one or more UEs may preform groupcasting to that said assigned or generated group destination ID. Other criteria may be that the UEs perform a certain action so that a logical group may be formed, e.g., during stop and go traffic, fast breaking at the end of a traffic jam, coordinated acceleration when a traffic light turns green. In such scenarios, the group may exist only as long as several vehicles in proximity perform this action.

As mentioned above, embodiments of the first aspect of the present invention introduce suggest to define a logical group and to assign to all member UEs of the logical group the same destination ID or address, which is unique for the logical group. For example, by using group criteria, like platooning criteria a common destination Layer-2 Group ID may be assigned or allocated or pushed to all members of the group. In other words, all the UEs within a logical group, e.g. UEs in a platoon, are assigned the same destination L2 ID. Consequently, the multicast communications, or equivalently groupcast communications, that are from one of the group members to all other group members:

have the same destination L2 ID, are distinct by the source ID.

In the following embodiments for assigning the same destination L2 ID to all UEs in a logical group are described. In accordance with first embodiments the assignment may be handled by an application server which manages the group, like the VAE server. The VAE server assigns the unique destination L2 ID for the logical group, e.g. the platoon, and pushes it to the VAE clients. The VAE server is the application server and may be located outside or inside the network. In accordance with other examples, a UE or a group of UEs may host the VAE server.

In accordance with second embodiments the assignment may be handled by autonomously, e.g., UEs may be configured with rules to be able to generate an appropriate destination L2 ID based on the logical group criteria.

In accordance with embodiments, for handling the dynamism of the logical group, e.g., in case of a new member joining the group or a current member leaving the group, the application and/or the V2X layer may be responsible for adding/assigning and/or revoking the destination L2 ID.

Further embodiments provide for distinguishing and resolving a conflict or clash between source L2 IDs within a same group. For example, initially, a member of the group that wants to become a source, considers the source L2 ID of current sources. The UEs application/V2X layer appropriately generates or selects a different source L2 ID based on this information. A clash of source L2 IDs may happen, if two members generate or select the same source L2 ID during this process. In accordance with examples, such a clash may be detected and resolved in a conventional way by the application layer. In accordance with other examples, upon resource request, e.g., the transmission of a buffer status report, the entity that allocates and schedules the resource may detect the source L2 ID conflict and signal to both or one of the sources so as to notify them/it about the source L2 ID conflict. The notified source(s) may generate or select a new source L2 ID. This solution may also consider that there is a feedback from the AS layer to the V2X layer/Application layer about this ID conflict. To resolve the conflict, it is sufficient that one of the two conflicting source changes its source L2 ID. In accordance with yet further examples, the entity that allocates and schedules the resources may notify only one of the sources about the conflict so as to reduce the signaling overhead associated with the conflict handling, e.g. if the priority of one of the sources is lower, this source may be the only source that is notified about the ID clash.

Further embodiments provide for distinguishing and resolving a clash between destination L2 IDs in two different groups. A conflict arising from different applications, like V2X applications, assigning the same or identical destination L2 IDs to different logical groups may be resolved within the application, e.g. by a applying a procedure as described in reference [2].

Further embodiments of the first aspect are directed to approaches for indicating the existence of a logical group to a network entity or a combination of network entities. The network entity may be a base station, e.g., a gNB, and/or a UE, and/or a network component, e.g. a core network function. This entity is called herein a group-supervisor. In accordance with embodiments, a group supervisor is always a UE, unless not allowed by the base station (in-coverage scenario) or by the network. For example, the gNB may be a group supervisor when a congestion of the cell is below a certain threshold. Once past the threshold, a UE may become the group-supervisor.

The group-supervisor may know or collect the destination L2 ID of the all or selected set of UEs of one of more logical groups, and the network may use this knowledge for resource management and/or improved service to the logical group members and other users in the network. The group-supervisor may infer the information of the existence of the corresponding group and its member from the common destination L2 ID.

In accordance with embodiments, a base station, e.g. a gNB, is the group-supervisor. The base station may be the group-supervisor, when the group of UEs are in-coverage and operate either in RRC_Idle, RRC_Inactive or RRC_Connected mode. The UEs of the same logical group, e.g., platoon, intending to perform a V2X group-based communication may signal this to the base station, e.g., the SidelinkUEinformation RRC message shown in FIG. 15.

Conventionally, the element DestinationInfoList-r12 form the above message is a list of all intended destination IDs when the UE performs a groupcast/multicast communication, however, in accordance with embodiments of the present invention the element DestinationInfoList-r12 is the single unique destination L2 ID that describes the all the members of the logical group. The element V2X-platoon describes whether the transmission is for a groupcast (with multiple receivers) for a logical group (V2X-Platoon may be a true or false flag) and associates the logical group with an ID "Platoon-Identity" using the "SL-V2X-Platoon" IE.

The base station may infer from the fact that destinationInfoList-r12 includes identical or the same IDs that there is a logical group, e.g., a platoon. In accordance with other examples, the UE requesting resources for the group-based communication may inform the base station from about the logical group using the IE V2X-platoon. In either case, the base station may provision the resources accordingly based on the existence of the logical group, which may facilitate enhanced scheduling for source member UEs.

In accordance with other embodiments, a UE is the group-supervisor. Such a UE may be a member of the logical group and, consequently, has the same destination L2 ID, as the rest of the group members. The group member UE that becomes the group supervisor will be called herein a group-leader, or shortly GL UE. The GL UE may recognize and collect the source ID of the source UEs of multicast transmissions within the group that it leads. Multicast transmissions within the group address the same destination L2 ID as the destination L2 ID of the GL UE. The GL UE may know the source ID of transmitting UEs within the group, for example, it may request/collect information from these UEs, to help resource allocation and scheduling, etc. The information may be obtained by using RRC signaling, e.g., via RRC only in case of NR Type 1 UEs or via RRC configuration and SCI activation/deactivation in case of NR Type 2 UEs, or by using the SCI on the common control channel. In accordance with embodiments, the GL UE may implement such only for high priority traffic, like traffic with high QoS requirements, or for certain traffic types, like SPS or OS, while for others traffic the member UEs sense the resources provided for the SL communication, like the SL PR or mini-RP (mRP). When being in-coverage, the GL UE may communicate to the gNB on behalf of the whole group, e.g., to request resources, etc. Further, in case the GL UE is responsible for the resource management of the group, other sources in the group send their resource requests to the GL UE.

In accordance with embodiments, the GL UE may be selected by the application layer, and the group members are aware of the GL UE in their own application layer. This awareness may be transferred to the AS layer. The GL UE may also be selected by the application layer as a configuration to the UEs, or as pre-set or pre-configured rules on the priority of source IDs for being the GL UE.

In accordance with other embodiments, the GL UE may be selected by an entity or a group of entities of the communication network. For example, a source node that initiates the first groupcast within the group may be the initial GL UE. This simplifies the selection and reduces the signaling load.

Once selected, the GL UE may signal its existence to the whole group, e.g., periodically or at certain intervals. In case the GL UE unexpectedly is disconnected or disappears, other group members, including other sources, may recognize the absence of the GL UE. For example, a disconnection or disappearing of the GL UE may be recognized because a timer after a last announcement message expired, or the GL UE does not respond to requests, or the GL UE does not transmit for a certain time. In such a case, the sources within the group may signal/negotiate among each other to decide which is the next GL UE. In other examples avoiding extra signaling, an automatic configuration may be used, based on which everyone understands or infers without negotiation who is the next GL UE. One example may be based on the order of source L2 IDs, e.g. an ascending order or descending order. In case such configuration exists, the first source in the queue may try to become the GL UE and negotiates this to other sources.

In case the GL UE wants to stop being the GL UE of a group, e.g., when the GL UE is about to leave the group or for any other reason does not want to handle the GL UE functionality anymore, e.g. due to drained battery power or low energy status or low fuel, another source may become the GL UE. The process may be as described above, or, in accordance with other examples, the current GL UE may signal its request to another source UE. If the other source UE responses positive, the current GL UE signals all group members that it will no longer be the GL UE, then steps down from being the GL UE and the other source becomes the new GL UE. If the current GL UE is also responsible for the resource management of the group, the information collected by the current GL UE may be transferred from the current GL UE to the new GL UE.

Figure 12:
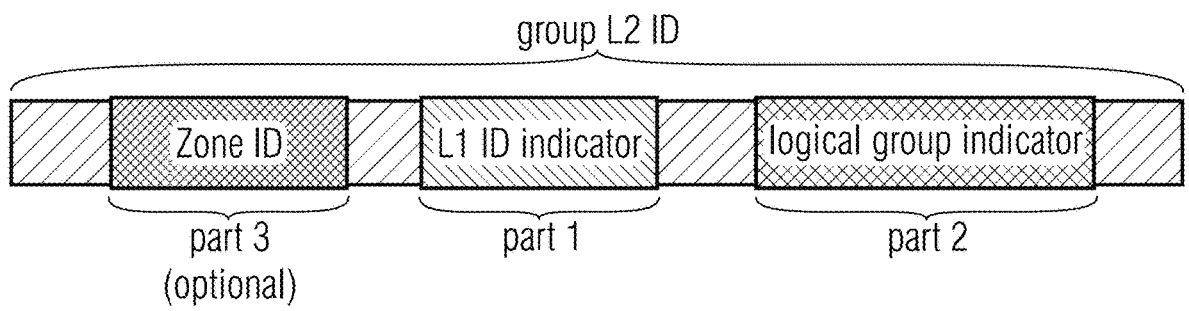
FIG. 12 is an example of a destination L2 ID according to an embodiment.

In accordance with further embodiments of the first aspect, a simplified structure of the common destination ID for the logical group may be provided. When considering the L1 IDs and L2 IDs, the destination L2 ID is generated in the V2X layer or in higher layers, and mapped to the L1 ID. To address the problem that the L1 ID is transmitted on the physical layer with inherent constraints on the size, especially if it is transmitted via the control channel, embodiments provide an overall structure of the destination L2 ID which has at least two parts, a first part that refers to/implies the logical group ID, and a second part that refers to/implies group Layer-1 ID (L1 ID), where the first and second part may fully or partially overlap. FIG. 12 is an example of a destination L2 ID according to an embodiment. The depicted parts or sections may be distributed within the whole destination L2 ID and may have different proportional lengths. As is illustrated in FIG. 12, the destination L2 ID may also include a third part that refers to/implies a geographical or zone ID which might fully or partially overlap with the first and the second part. This part may be advantageous as it enables different groups in different geographical zones to re-use a same group L1 ID.

Aspect (2)

Figure 13:
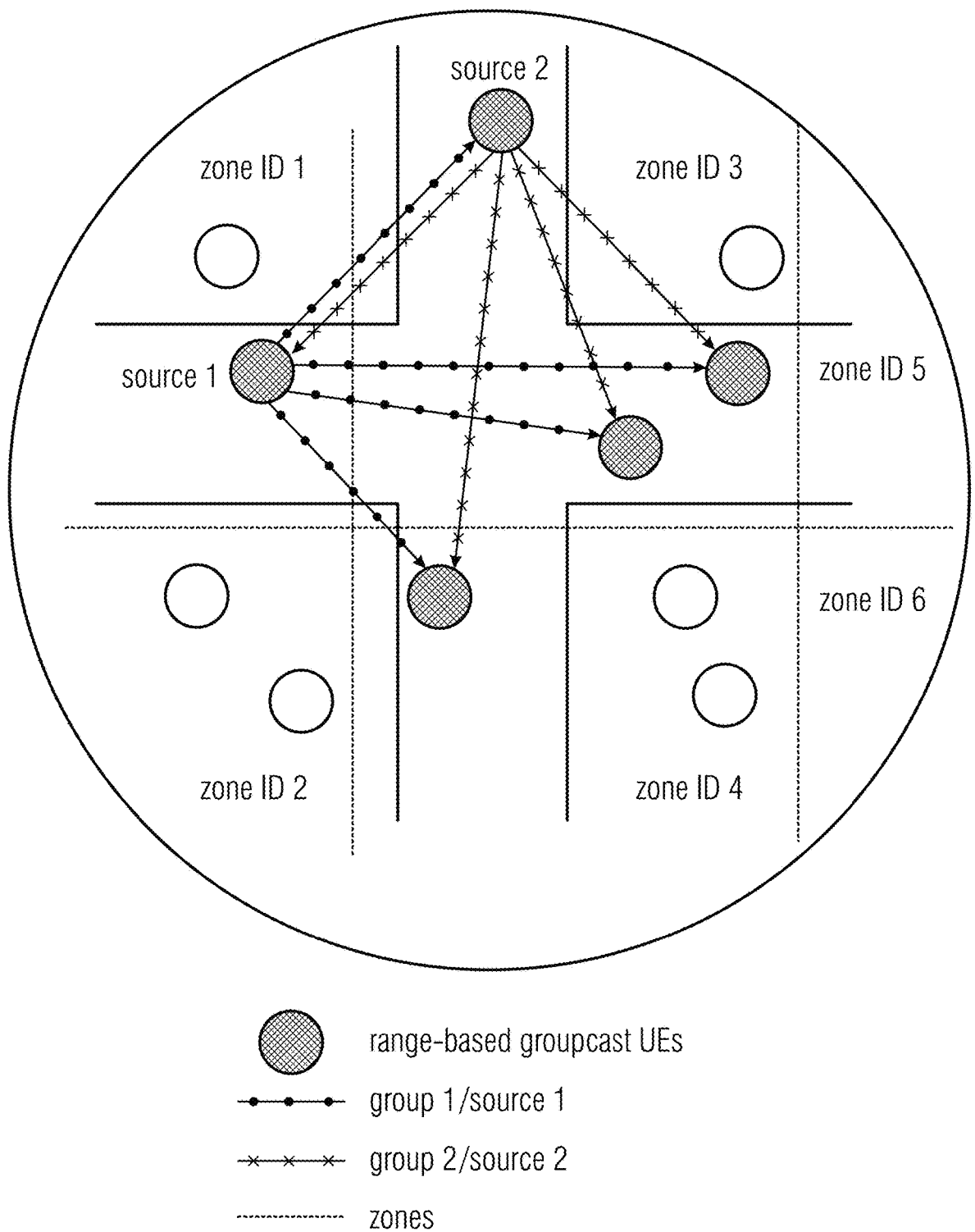
FIG. 13 illustrates an example case of range based group formation of UEs at a traffic intersection.

Embodiments of the second aspect of the present invention concern de-centralized group communications. For example, a gNB may allocate a dedicated a set of groupcast resources based on the position/range of the UE, which may span multiple zones for a subset of UEs, as illustrated in FIG. 13, so that a UE/base station infer a logical group based on their range/position/speed/velocity. FIG. 13 illustrates an example case of range based group formation of UEs at a traffic intersection.

In conventional approaches or schemes, Group 1 and Group 2 are allocated independent resources, however, since in accordance with the first aspect of the present invention the UEs form a logical group based on their range and context, the UEs are at the intersection, and via the common destination ID provided for the group the network is made aware that source 1 and source 2 are part of the same logical group. The lifetime of such range-based closed groups may be limited and the UEs may not have a long-term relationship, like in the illustrated platooning use case. The gNB may collect information such as position and velocity to determine logical groups so as to provide resources with the necessitated QoS. In FIG. 13 the closed range-based group spans Zone IDs 1,3 and 4. In accordance with embodiments, a relationship across these zones may be established via a common resource pools, like a mRP, so as to enable coordinated resource allocation. For example, in the event that Zone ID 3 is heavily occupied, the UEs in that zone may transmit with a lower QoS due to the lack of resources as compared to the member UEs in Zone ID 1 and Zone ID 4.

In accordance with embodiments a temporary logical group may be formed in a limited zone, like in FIG. 13, using a UE, like V2X UE. The UEs have a common destination L2 ID that refers to the geographical location for such temporary group formation. For this group only the geographical location may be important so that so other fields of the L2 ID in FIG. 12 may be filled with dummy/do not care bits or bits can be reserved for future use. When a UE wants to address a temporary group in vicinity, it groupcasts to that L2 ID address. A UE that receives this groupcast compares the destination L2 ID of this groupcast with all of its own destination L2 IDs. Just for the special L2 ID that relates to its geographical zone, the UE ignores dummy bits and only considers and compares the valid bits.

In accordance with other embodiments a temporary logical group may be formed in a limited zone, like in FIG. 13, using a base station BS that groupcasts to the geographical area. In accordance with examples, the BS may use power control and beam-selection/formation to cover the desired geographical zone and to broadcast logical group information, like the destination ID, to the area. The information may be broadcast periodically or at certain times to the particular geographic area. A signaling flow may include a signaling from the UE to the BS requesting a groupcast communication for the logical group including the destination L2 ID. The BS broadcasts or multicasts, or equivalently groupcasts, to all other UEs in the geographic area which match logical group criteria the existence of logical group and the destination L2 ID of logical group. In either case, the request to transmit something to this specific area ID may be a request by a UE, another group of UEs, higher layers or an application function/server.

General

Embodiments of the present invention have been described in detail above, and the respective embodiments and aspects may be implemented individually or two or more of the embodiments may be implemented in combination. It is noted that a UE may have multiple destination L2 IDs and/or multiple source L2 IDs depending on different transmission/receptions, e.g. unicast, groupcast and multicast.

Embodiments of the present invention have been described in detail above with reference to a sidelink communication using the PC5 interface. However, the present invention is not limited to the use of the PC5 interface. Any other interface allowing for a direct communication among one or more UEs may be employed, e.g., interfaces according to the IEEE 802.11p standard, the IEEE 802.15.4 standard (Zigbee), and others.

In some of the embodiments described above, reference has been made to respective vehicles being either in a mode in which SL resource allocation configuration or assistance is provided by a base station, e.g., the connected mode, also referred to as NR mode 1 or LTE mode 3 configuration, or vehicles being in a mode in which when no SL resource allocation configuration or assistance is provided by a base station, e.g., the idle mode, also referred to as NR mode 2 or LTE mode 4 configuration. However, the present invention is not limited to V2V communications or V2X communications, rather it is also applicable to any device-to-device communications, for example non-vehicular mobile users or stationary users that perform a sidelink communication, e.g., over the PC5 interface. Also, in such scenarios, the inventive aspects described above may be employed.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a receiver may comprise one or more of a mobile or stationary terminal, an IoT device, a ground-based vehicle, an aerial vehicle, a drone, a building, or any other item or device provided with network connectivity enabling the item/device to communicate using the wireless communication system, like a sensor or actuator. In accordance with embodiments, a transmitter may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 14:
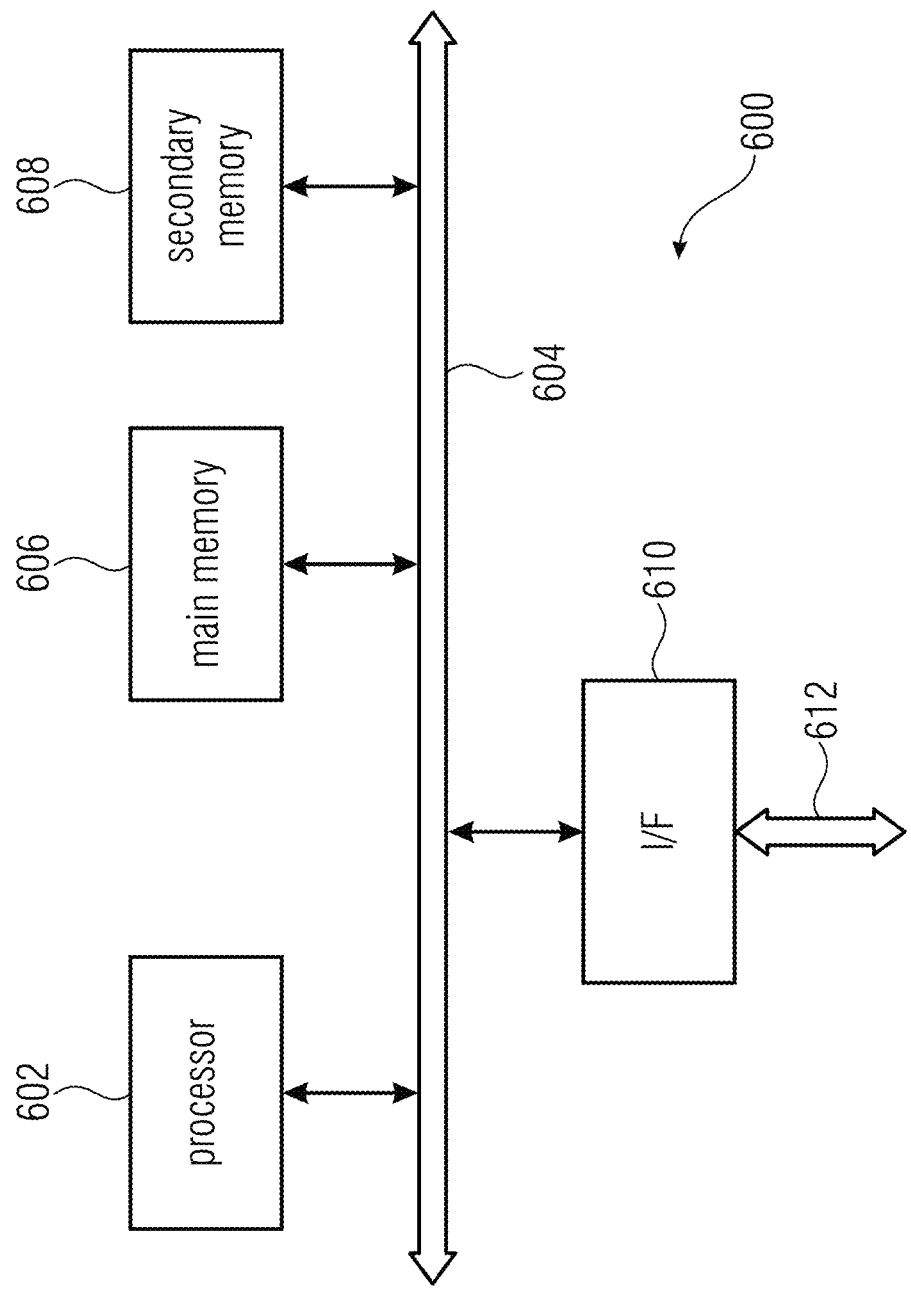
FIG. 14 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 14 illustrates an example of a computer system 600. The units or modules as well as the steps of the methods performed by these units may execute on one or more computer systems 600. The computer system 600 includes one or more processors 602, like a special purpose or a general purpose digital signal processor. The processor 602 is connected to a communication infrastructure 604, like a bus or a network. The computer system 600 includes a main memory 606, e.g., a random-access memory (RAM), and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LIST OF ACRONYMS AND SYMBOLS

BS Base Station
CBR Channel Busy Ratio
D2D Device-to-Device
EN Emergency Notification
eNB Evolved Node B (base station)
FDM Frequency Division Multiplexing
LTE Long-Term Evolution
PC5 Interface using the Sidelink Channel for D2D communication
PPPP ProSe per packet priority
PRB Physical Resource Block
ProSe Proximity Services
RA Resource Allocation
SCI Sidelink Control Information
SL sidelink
STTI Short Transmission Time Interval
TDM Time Division Multiplexing
TDMA Time Division Multiple Access
TPC Transmit power control/transmit power command
UE User Entity (User Terminal)
URLLC Ultra-Reliable Low-Latency Communication
V2V Vehicle-to-vehicle
V2I Vehicle-to-infrastructure
V2P Vehicle-to-pedestrian
V2N Vehicle-to-network
V2X Vehicle-to-everything, i.e., V2V, V2I, V2P, V2N

REFERENCES

[1] R1-1817780, "Discussion on Groupcast for NR V2X", Qualcomm, Spokane, USA, November 2018
[2] TR 23.786, "Study on architecture enhancements for EPS and 5G System to support advanced V2X services (Release 16)", V0.10.0, 3GPP, December 2018.
[3] TS 23.303, "Proximity-based services (ProSe); Stage 2 (Release 15)", V15.1.0, 3GPP, June 2010.
[4] J. Schlienz and A. Roessler, "Device-to-Device Communication in LTE", Rohde-Schwarz Whitepaper, September 2015.

[5] TR 23.795, "Study on application layer support for V2X services; (Release 16)", V1.0.0, 3GPP, June 2018.

The invention claimed is:

1. A wireless communication system, comprising
a plurality of user devices, UEs, and
a logical group for a groupcast communication, the logical group comprising a plurality of member UEs to be connected via a sidelink for a sidelink communication with each other,
wherein the plurality of member UEs of the logical group have the same destination identification, ID, and
wherein the destination ID is a layer 2 ID, the layer 2 ID comprising a structure comprising:
a part that refers to or implies a logical group ID for the logical group or as inferred from the one or more logical group criteria, and
a part that refers to or implies a layer 1 ID.

2. The wireless communication system of claim 1, wherein the logical group is managed by an application server, the application server assigning the destination ID for the logical group, and wherein the application server is located outside or inside the wireless communication system, or one or more of the plurality of UEs hosts the application server.

3. The wireless communication system of claim 2, wherein the application server handles joining of a new UE to the logical group and the assignment of the destination ID to the new UE, and leaving of a member UE of the member UEs and revocation of the destination ID from the leaving of the member UE.

4. The wireless communication system of claim 1, wherein the logical group is managed by one or more of the plurality of member UEs configured with rules for generating the destination ID for the logical group.

5. The wireless communication system of claim 1, wherein, in case one of the plurality of member UEs is to perform a transmission within the logical group, the transmitting member UE is configured to generate a source ID, and wherein, for generating the source ID, the transmitting member UE is configured to consider source IDs of current or existing transmitting member UEs so as to generate or select a different source ID.

6. The wireless communication system of claim 5, wherein, in case two transmitting member UEs generate or select the same source ID, the conflict in the source IDs
is detected and resolved by the application layer, or
responsive to a request for transmitting resources by the transmitting member UEs, an entity of the wireless communication system for allocating and scheduling resources including gNB is configured to detect the conflict based on the source ID of a source UE and/or cell radio network temporary identifier (C-RNTI) or the conflict is reported by a member UE of the logical group, and to signal to at least one of the transmitting member UEs a notification about the source ID conflict, and
is detected by a member UE in out-of-coverage case,
wherein at least one transmitting member UE of the two transmitting member UEs is configured to generate or select a new source ID.

7. The wireless communication system of claim 1, wherein the layer 2 ID structure further comprises a part that refers to or implies a geographical or zone ID indicating a geographical region where one of the plurality of member UEs is located.

8. The wireless communication system of claim 1, wherein a groupcast transmission to the plurality of member UEs of the logical group comprises
a sidelink (SL) groupcast originating from one of the plurality of member UEs of the logical group, or
a SL groupcast originating from a UE outside the logical group, or
a groupcast originating from a base station.

9. The wireless communication system of claim 1, wherein the member UEs are located in different zones of a base station coverage area, and wherein the base station is configured to provide a resource set, which is one of a resource pool, RP, or a mini-RP, for the sidelink (SL) communication within the logical group for the different zones.

10. A user device, UE, for a wireless communication system, the wireless communication system comprising a plurality of user devices, UEs, wherein
the UE is a member UE of a logical group for a groupcast communication, the logical group comprising a plurality of member UEs to be connected via a sidelink for a sidelink communication with each other,
wherein the UE has assigned the same destination identification, ID, as all other member UEs of the logical group, and
wherein the destination ID is a layer 2 ID, the layer 2 ID comprising a structure comprising:
a part that refers to or implies a logical group ID for the logical group or as inferred from the logical group criteria, and
a part that refers to or implies a layer 1 ID.

11. A base station for a wireless communication system, the wireless communication system comprising a plurality of user devices, UEs, wherein
the base station is configured to serve one of a plurality of member UEs of a logical group for a groupcast communication, the logical group comprising the plurality of member UEs to be connected via a sidelink for a sidelink communication with each other,
wherein each of the plurality of member UEs of the logical group have assigned the same destination identification, ID, and
wherein the destination ID is a layer 2 ID, the layer 2 ID comprising a structure comprising:
a part that refers to or implies a logical group ID for the logical group or as inferred from the logical group criteria, and
a part that refers to or implies a layer 1 ID.

12. A method in a wireless communication system comprising a plurality of user devices, UEs, the method comprising:
defining a logical group for a groupcast communication, the logical group comprising a plurality of member UEs to be connected via a sidelink for a sidelink communication with each other, and
assigning to each of the plurality of member UEs of the logical group the same destination identification, ID,
wherein the destination ID is a layer 2 ID, the layer 2 ID comprising a structure comprising:
a part that refers to or implies a logical group ID for the logical group or as inferred from the logical group criteria, and
a part that refers to or implies a layer 1 ID.

13. A non-transitory digital storage medium having a computer program stored thereon to perform, when the computer program is run by the computer, a method in a wireless communication system comprising a plurality of user devices, UEs, the method comprising:
  defining a logical group for a groupcast communication, the logical group comprising a plurality of member UEs to be connected via a sidelink for a sidelink communication with each other, and
  assigning to each of the plurality of member UEs of the logical group the same destination identification, ID,
  wherein the destination ID is a layer 2 ID, the layer 2 ID comprising a structure comprising:
    a part that refers to or implies a logical group ID for the logical group or as inferred from the logical group criteria, and
    a part that refers to or implies a layer 1 ID.

14. The wireless communication system of claim 1, wherein the unique destination ID is unique for the logical group.

15. The user device, UE, of claim 10, wherein the unique destination ID is unique for the logical group.

* * * * *